(12) United States Patent
Amini et al.

(10) Patent No.: US 8,441,975 B2
(45) Date of Patent: *May 14, 2013

(54) MEDIUM ACCESSING MECHANISMS WITHIN MULTIPLE USER, MULTIPLE ACCESS, AND/OR MIMO WIRELESS COMMUNICATIONS

(75) Inventors: Peiman Amini, Mountain View, CA (US); Matthew James Fischer, Mountain View, CA (US); Vinko Erceg, Cardiff by the Sea, CA (US); Joseph Paul Lauer, North Reading, MA (US); Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/821,094

(22) Filed: Jun. 22, 2010

(65) Prior Publication Data
US 2010/0309872 A1 Dec. 9, 2010

Related U.S. Application Data

(63) Continuation-in-part of application No. 12/794,707, filed on Jun. 4, 2010, and a continuation-in-part of application No. 12/794,711, filed on Jun. 4, 2010.

(60) Provisional application No. 61/219,329, filed on Jun. 22, 2009, provisional application No. 61/184,420, filed on Jun. 5, 2009, provisional application No. 61/185,153, filed on Jun. 8, 2009.

(51) Int. Cl.
*H04H 20/71* (2008.01)

(52) U.S. Cl.
USPC .................. 370/312; 370/328; 370/338

(58) Field of Classification Search ............... None
See application file for complete search history.

(56) References Cited

U.S. PATENT DOCUMENTS

| | | | |
|---|---|---|---|
| 2003/0152059 A1* | 8/2003 | Odman | 370/338 |
| 2010/0016023 A1* | 1/2010 | Yamauchi et al. | 455/562.1 |
| 2010/0309842 A1* | 12/2010 | Das | 370/328 |
| 2011/0222490 A1* | 9/2011 | Fischer et al. | 370/329 |

* cited by examiner

*Primary Examiner* — David Oveissi
(74) *Attorney, Agent, or Firm* — Garlick & Markison; Shayne X. Short

(57) ABSTRACT

Medium accessing mechanisms within multiple user, multiple access, and/or MIMO wireless communications. A multi-user super-frame (MU-SF), as controlled by a MU-SF owner, is used to govern the manner by which various wireless communication devices have access to the communication medium. When various wireless communication devices operate within a wireless communication system, communication medium access can be handled differently for wireless communication devices having different capabilities. Per the MU-SF, those having a first capability may get medium access in accordance with a first operational mode (e.g., carrier sense multiple access/collision avoidance (CSMA/CA)), while those having a second capability may get medium access in accordance with a second operational mode (e.g., scheduled access). The respective durations for each of the first operational mode and the second operational mode within various MU-SFs need not be the same; the respective durations thereof may be adaptively modified based on any number considerations.

35 Claims, 41 Drawing Sheets

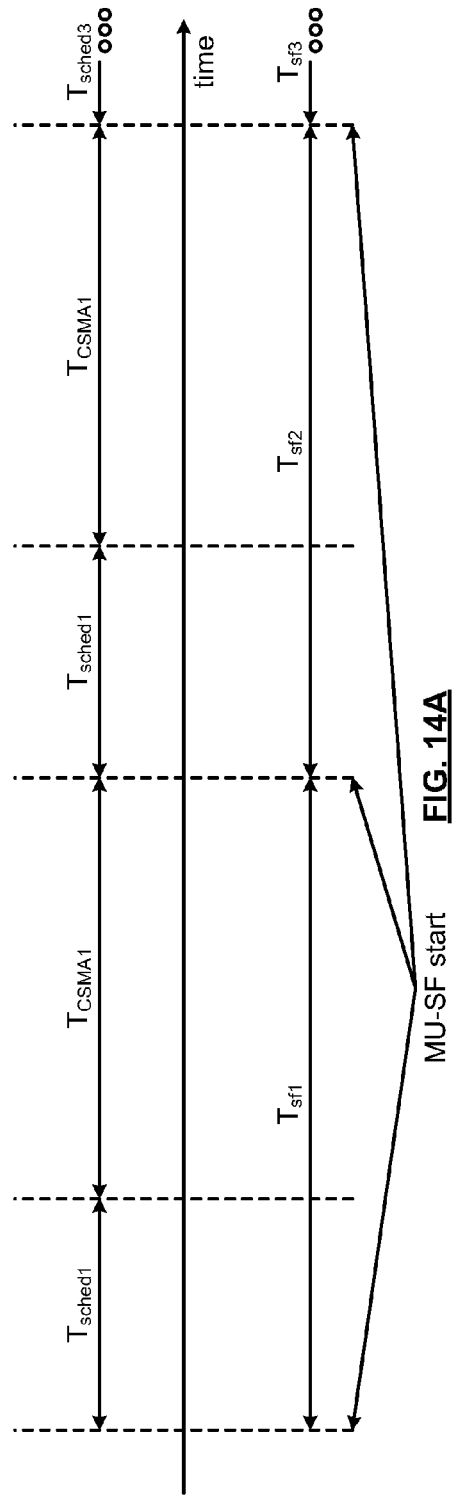
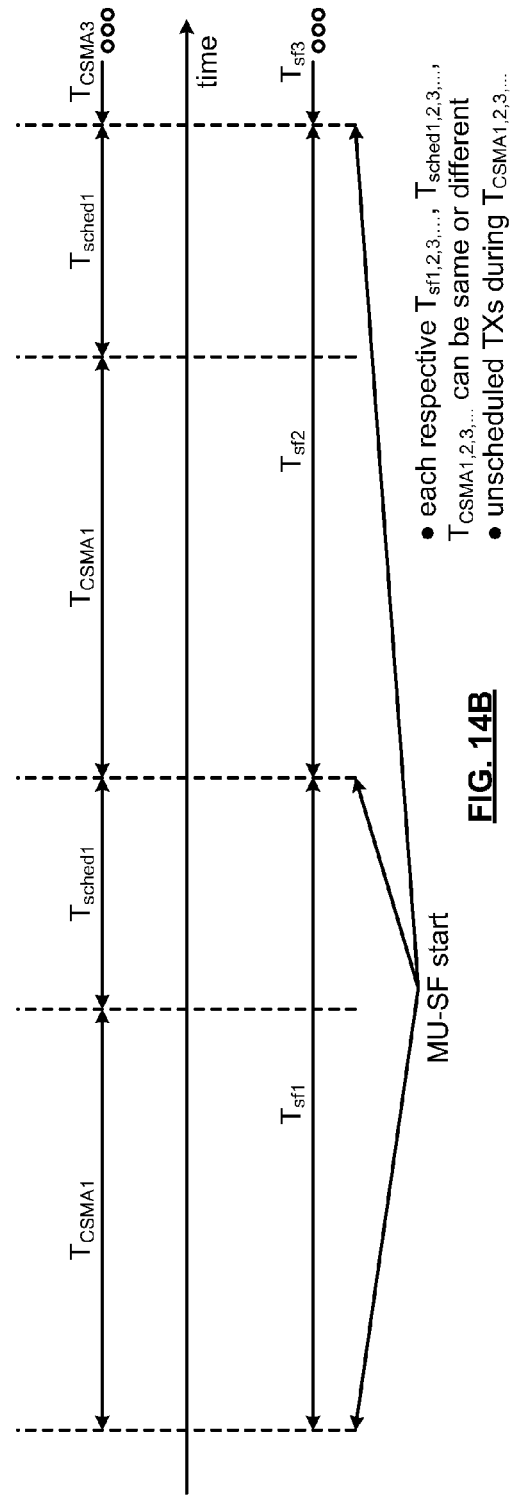

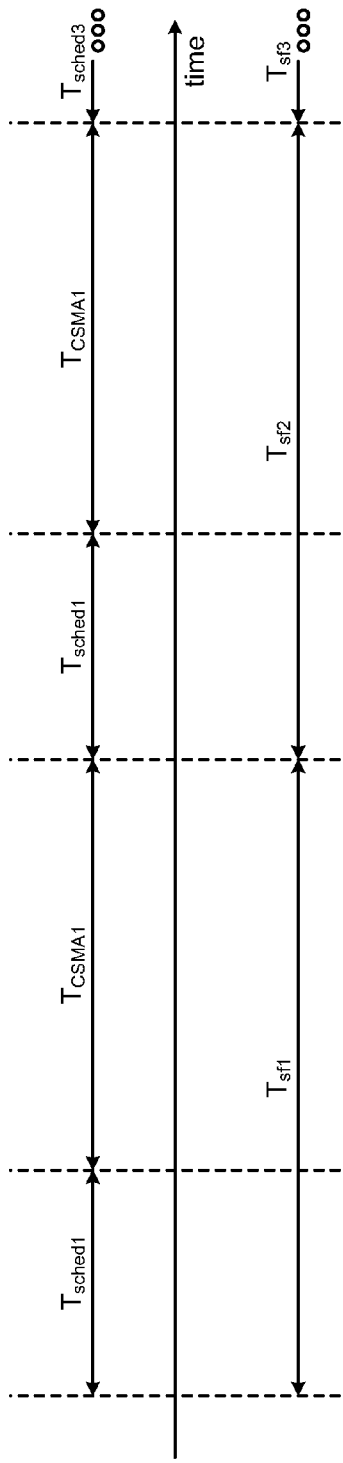
FIG. 16A normal operation
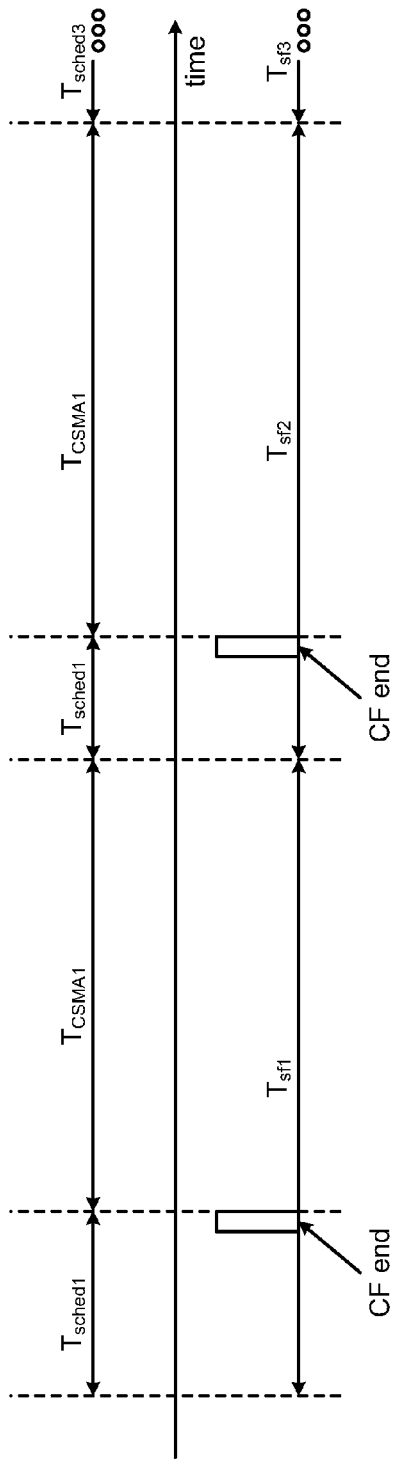
FIG. 16B CF end scenario

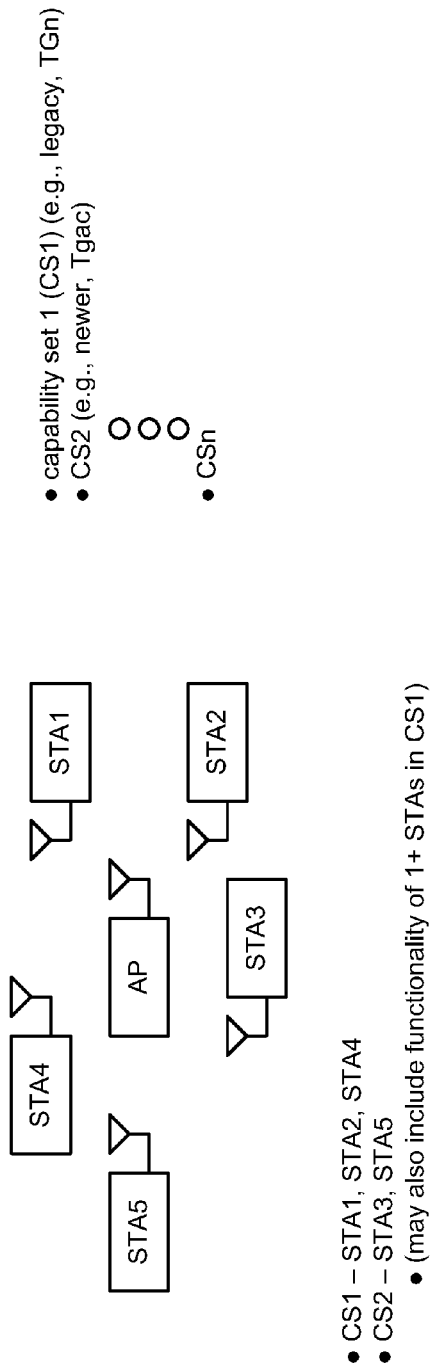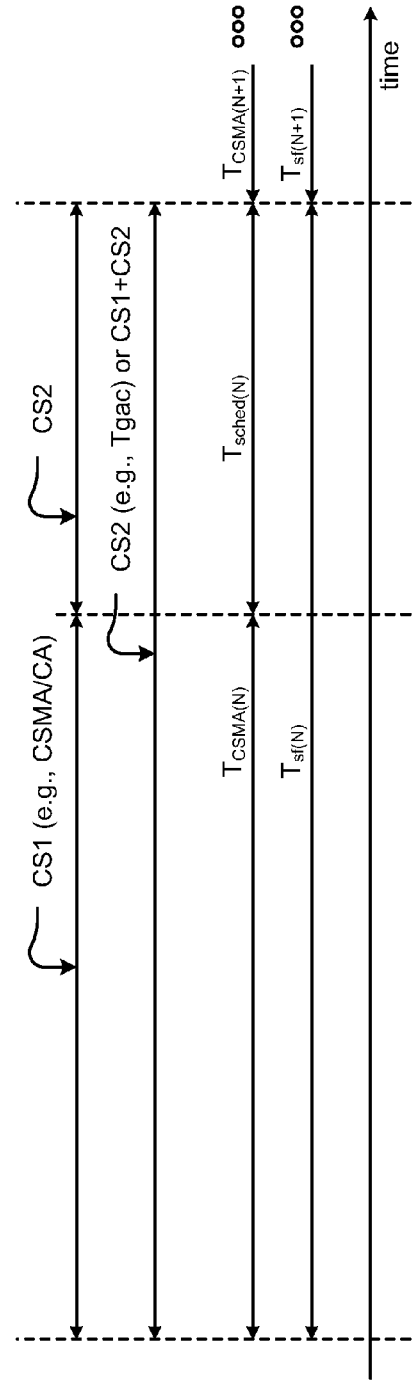
FIG. 17

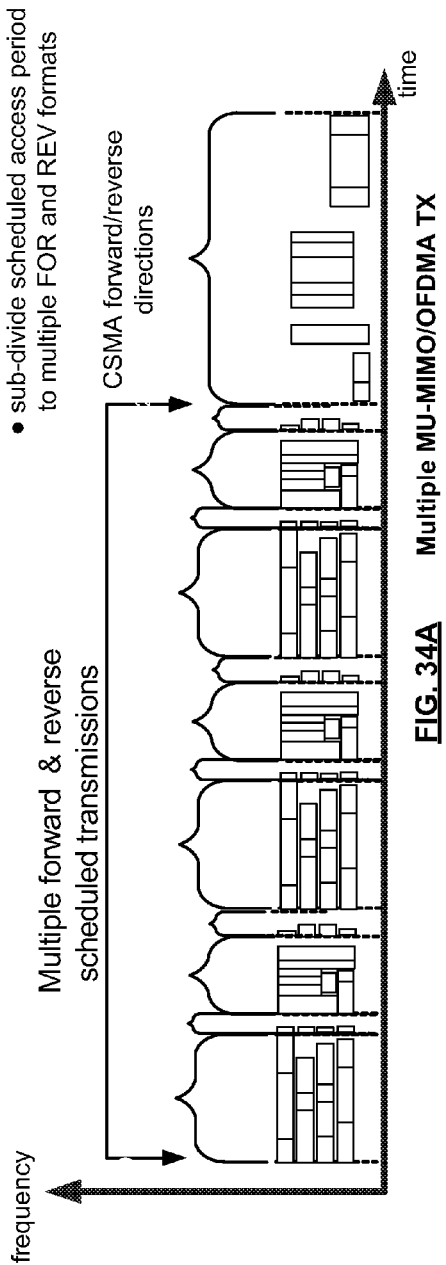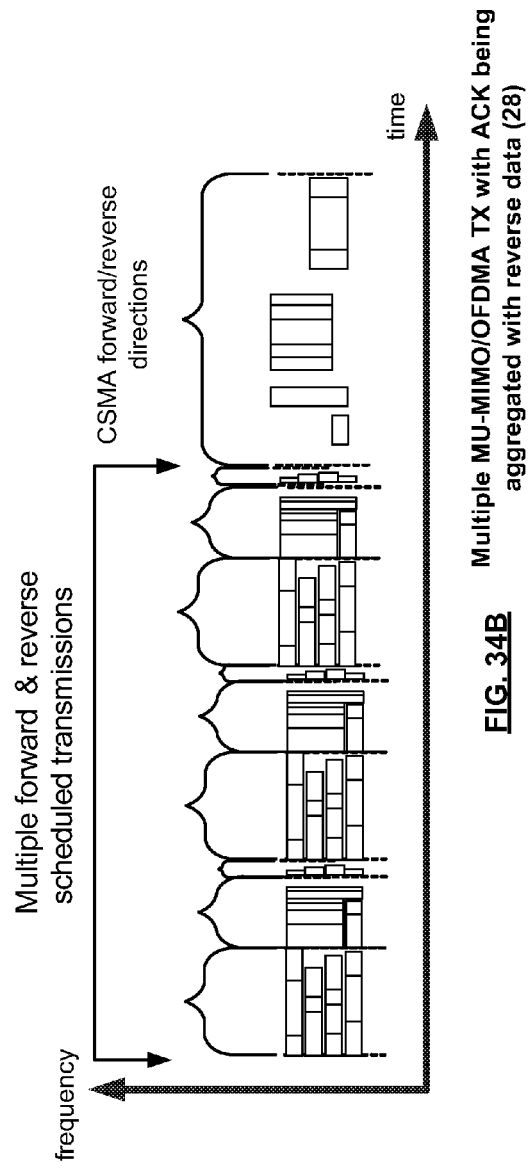

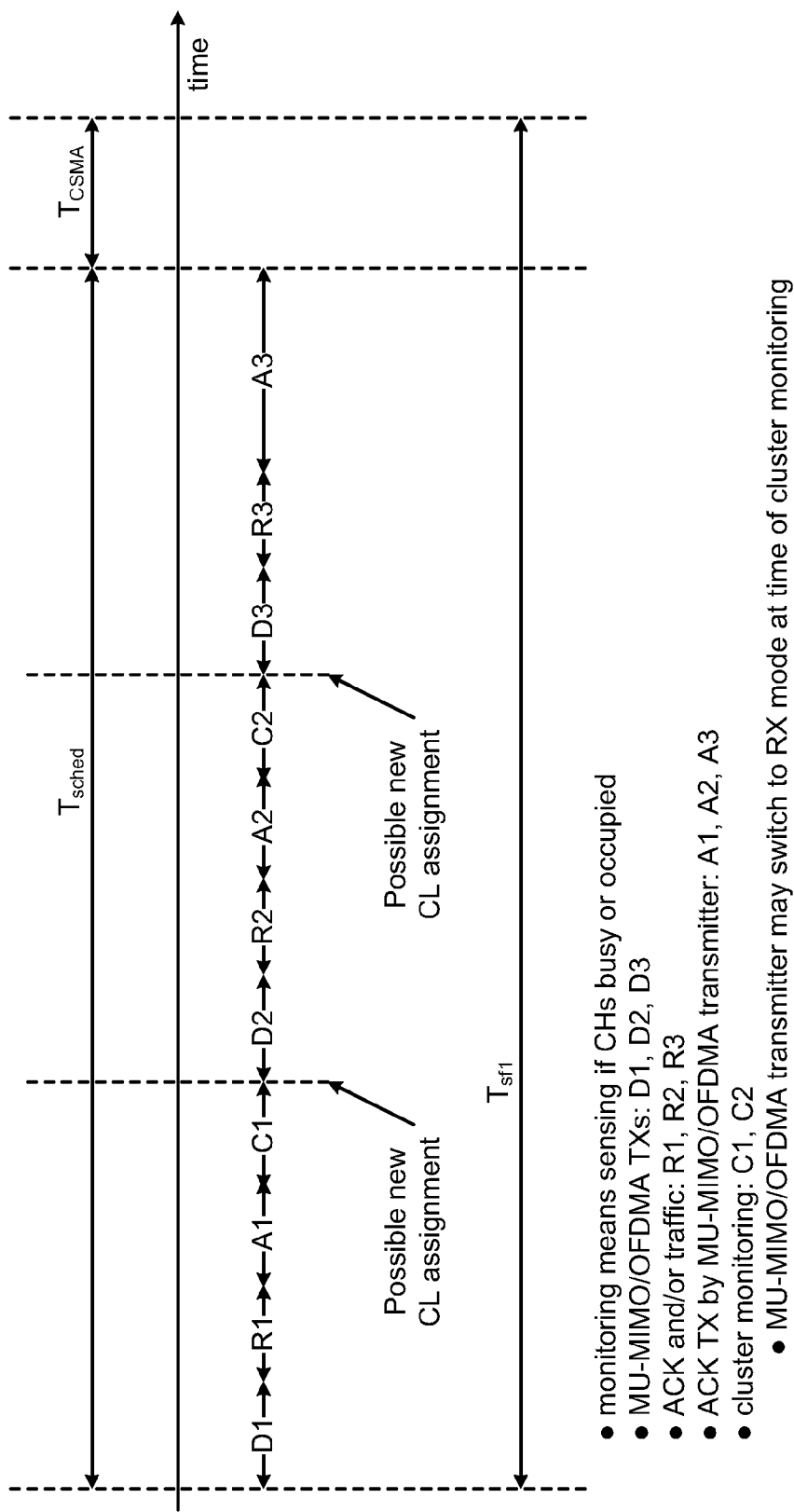
FIG. 35  multiple TXs and RXs with cluster monitoring (29)

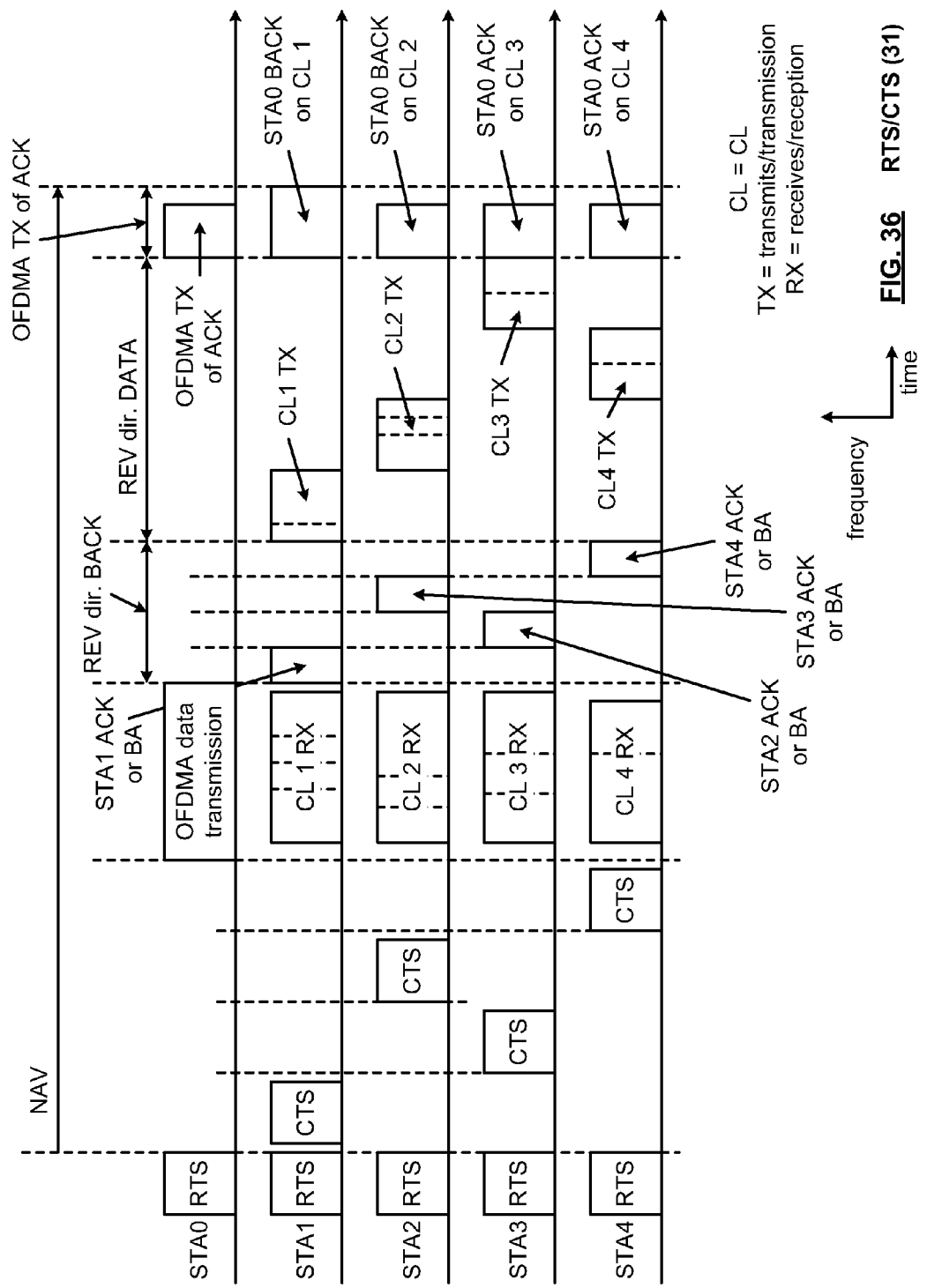
FIG. 36   RTS/CTS (31)

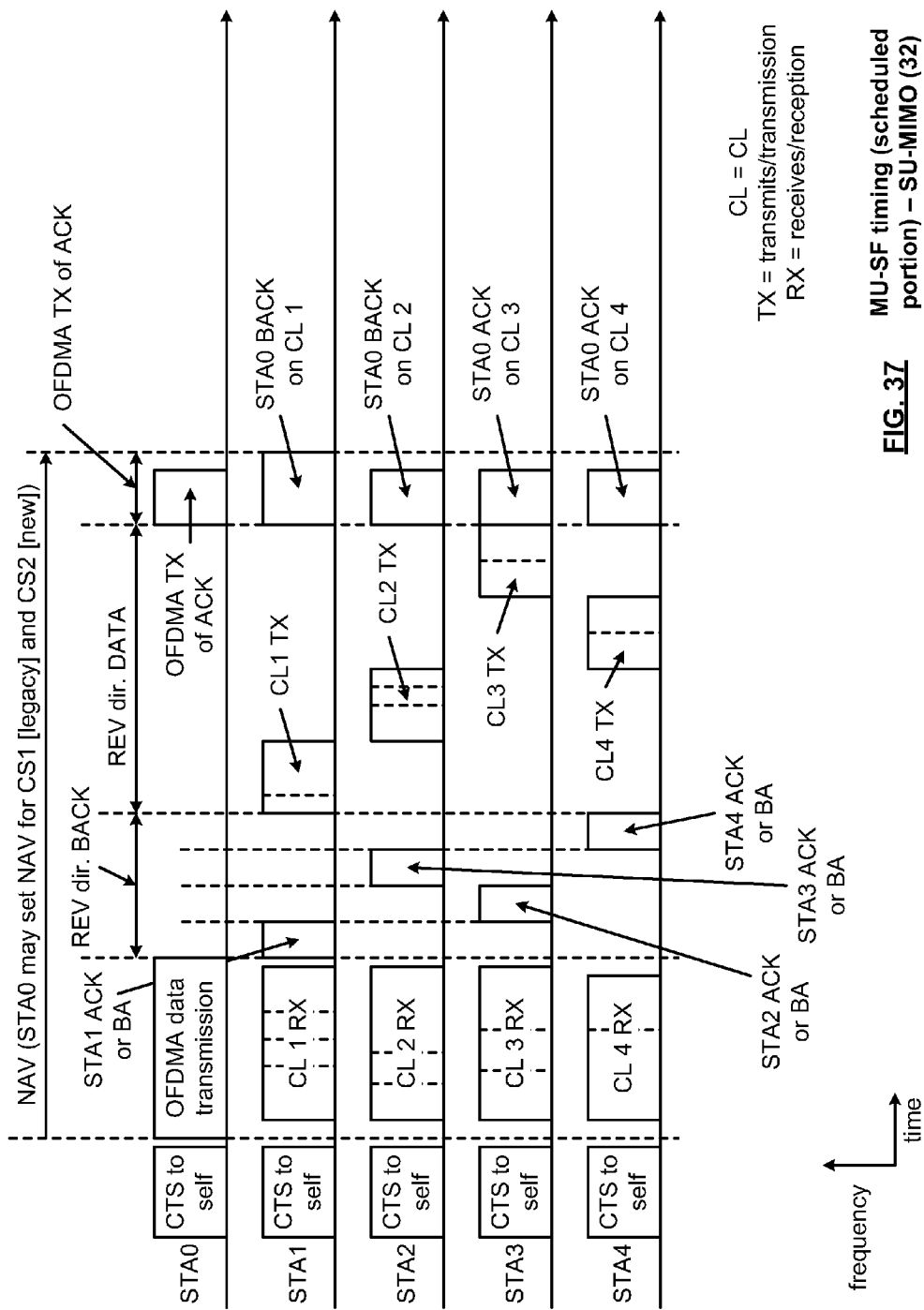
FIG. 37  MU-SF timing (scheduled portion) – SU-MIMO (32)

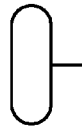
FIG. 39A / FIG. 39B

receiving a first MU-SF announcement frame from a transmitting wireless communication device (e.g., AP) 4110 based on the first MU-SF announcement, operating a plurality of wireless communication devices respectively in accordance with CSMA/CA and scheduled access during respective portions of a first plurality of MU-SFs indicated within the first MU-SF announcement 4120 receiving a second MU-SF announcement frame from the transmitting wireless communication device (e.g., AP) 4130 based on the second MU-SF announcement, operating the plurality of wireless communication devices (or a subset thereof) respectively in accordance with CSMA/CA and scheduled access during respective portions of a second plurality of MU-SFs indicated within the first MU-SF announcement 4140

FIG. 41A

operating at least one antenna for transmitting a first MU-SF announcement frame to a plurality of wireless communication devices, the first MU-SF announcement indicating at least a first super-frame therein (having a first CSMA/CA portion and a first scheduled access portion) 4111 based on at least one parameter, generating a second MU-SF announcement frame, the second MU-SF announcement indicating at least a second super-frame therein (having a second CSMA/CA portion and a second scheduled access portion) 4121 adapting, scaling, modifying, etc. respective durations of CSMA/CA and scheduled access portions 4121a operating at least one antenna for transmitting the second MU-SF announcement frame to the plurality of wireless communication devices (or a subset thereof) 4131

FIG. 41B

MEDIUM ACCESSING MECHANISMS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/219,329, entitled "Multi user accessing mechanisms for OFDM multiple access and/or multi-user MIMO transmissions," filed Jun. 22, 2009, pending.

Continuation-in-Part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   a. U.S. Provisional Application Ser. No. 61/184,420, entitled "OFDMA cluster parsing and acknowledgement to OFDMA/MU-MIMO transmissions in WLAN device," filed Jun. 5, 2009, now expired.
   b. U.S. Provisional Application Ser. No. 61/185,153, entitled "OFDMA cluster parsing and acknowledgement to OFDMA/MU-MIMO transmissions in WLAN device," filed Jun. 8, 2009, now expired.

The present U.S. Utility Patent Application also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility patent application Ser. No. 12/794,711, entitled "Transmission acknowledgement within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   a. U.S. Provisional Application Ser. No. 61/184,420, entitled "OFDMA cluster parsing and acknowledgement to OFDMA/MU-MIMO transmissions in WLAN device," filed Jun. 5, 2009, now expired.
   b. U.S. Provisional Application Ser. No. 61/185,153, entitled "OFDMA cluster parsing and acknowledgement to OFDMA/MU-MIMO transmissions in WLAN device," filed Jun. 8, 2009, now expired.

INCORPORATION BY REFERENCE

The following IEEE standard is hereby incorporated herein by reference in its entirety and is made part of the present U.S. Utility Patent Application for all purposes:

1. IEEE 802.11—-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

1. Technical Field of the Invention

The invention relates generally to communication systems; and, more particularly, it relates to medium accessing mechanisms within multiple user, multiple access, and/or MIMO wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 14A and FIG. 14B are diagrams illustrating various embodiments of general timing as may be effectuated using multi-user super-frames (MU-SFs) to effectuate medium access in accordance with various operational modes.

FIG. 16A and FIG. 16B are diagrams illustrating normal operation in comparison with use of a contention free (CF) end signal to transition between scheduled access and carrier sense multiple access/collision avoidance (CSMA/CA).

FIG. 17 is a diagram illustrating an embodiment of various wireless communication devices being partitioned into multiple capability sets (CSs) and their respective operation within one or more MU-SFs.

FIG. 34A and FIG. 34B are diagrams illustrating various embodiments of multiple forward and reverse scheduled transmissions as may be effectuated using respective MU-SFs.

FIG. 35 is a diagram illustrating an embodiment of multiple transmissions and receptions with cluster monitoring in accordance with a MU-SF.

FIG. 36 is a diagram illustrating an embodiment of request to send (RTS) and clear to send (CTS) exchanges among various wireless communication devices.

FIG. 37 is a diagram illustrating yet another embodiment of medium access among various wireless communication devices in accordance with scheduled access portions of a MU-SF.

FIG. 39A, FIG. 39B, FIG. 40, FIG. 41A, and FIG. 41B are diagrams illustrating various embodiments of methods for operating one or more wireless communication devices.

DETAILED DESCRIPTION OF THE INVENTION

Figure 1:
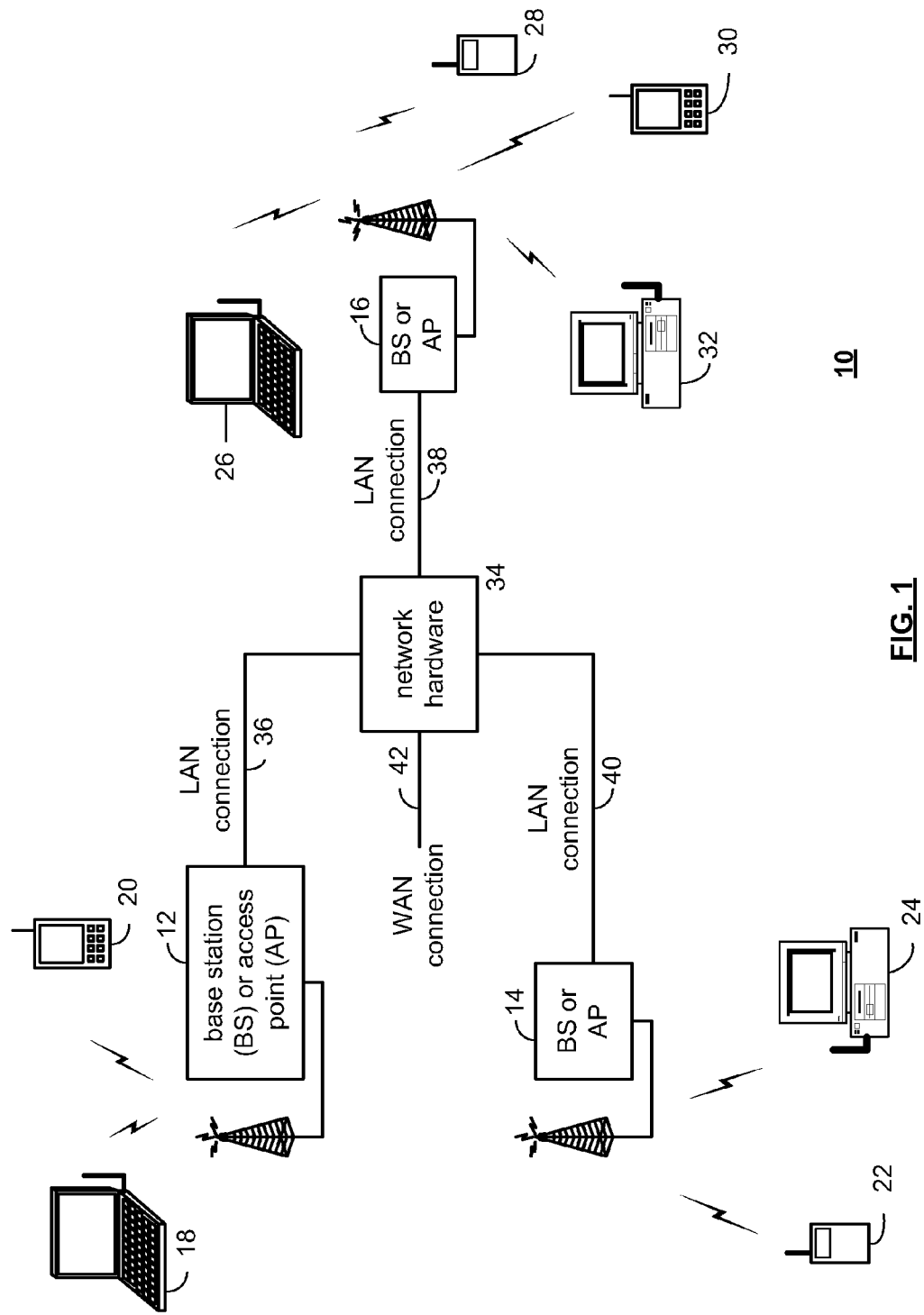
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
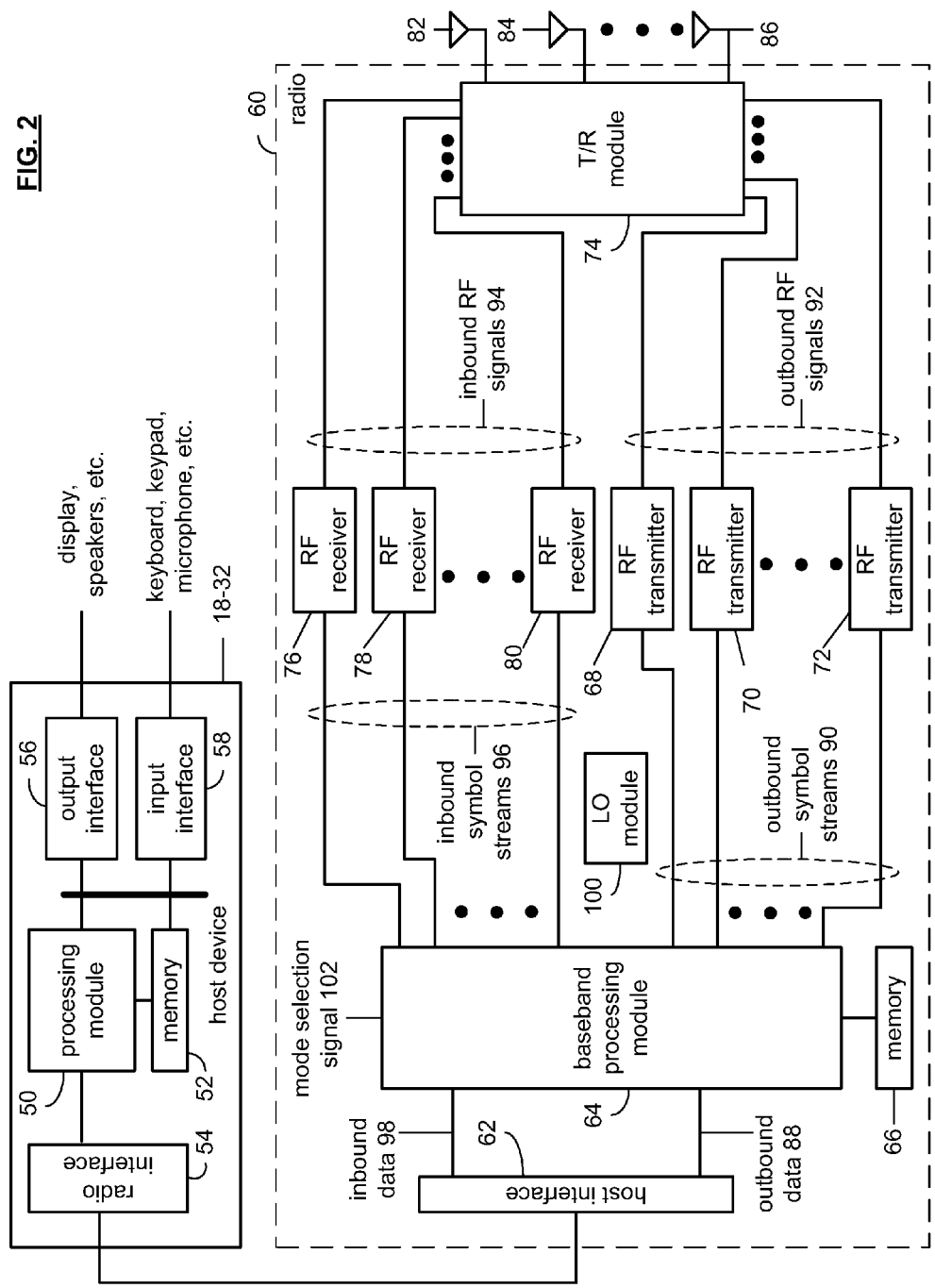
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
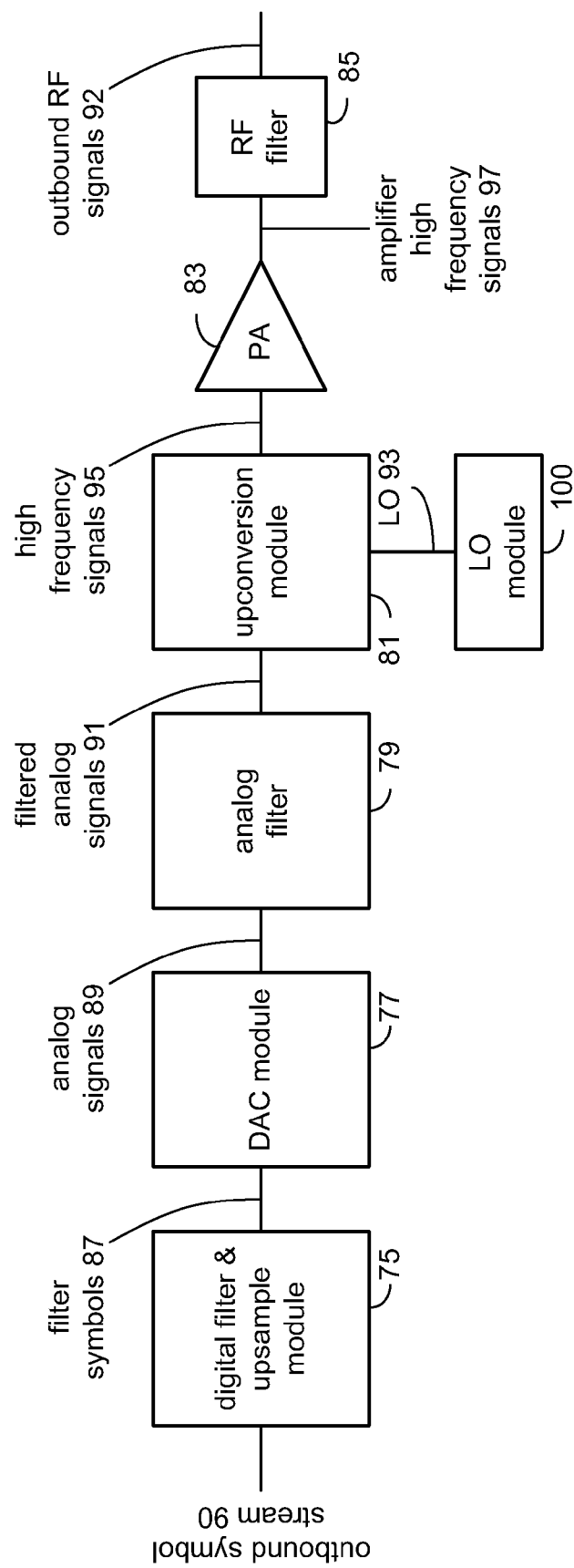
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
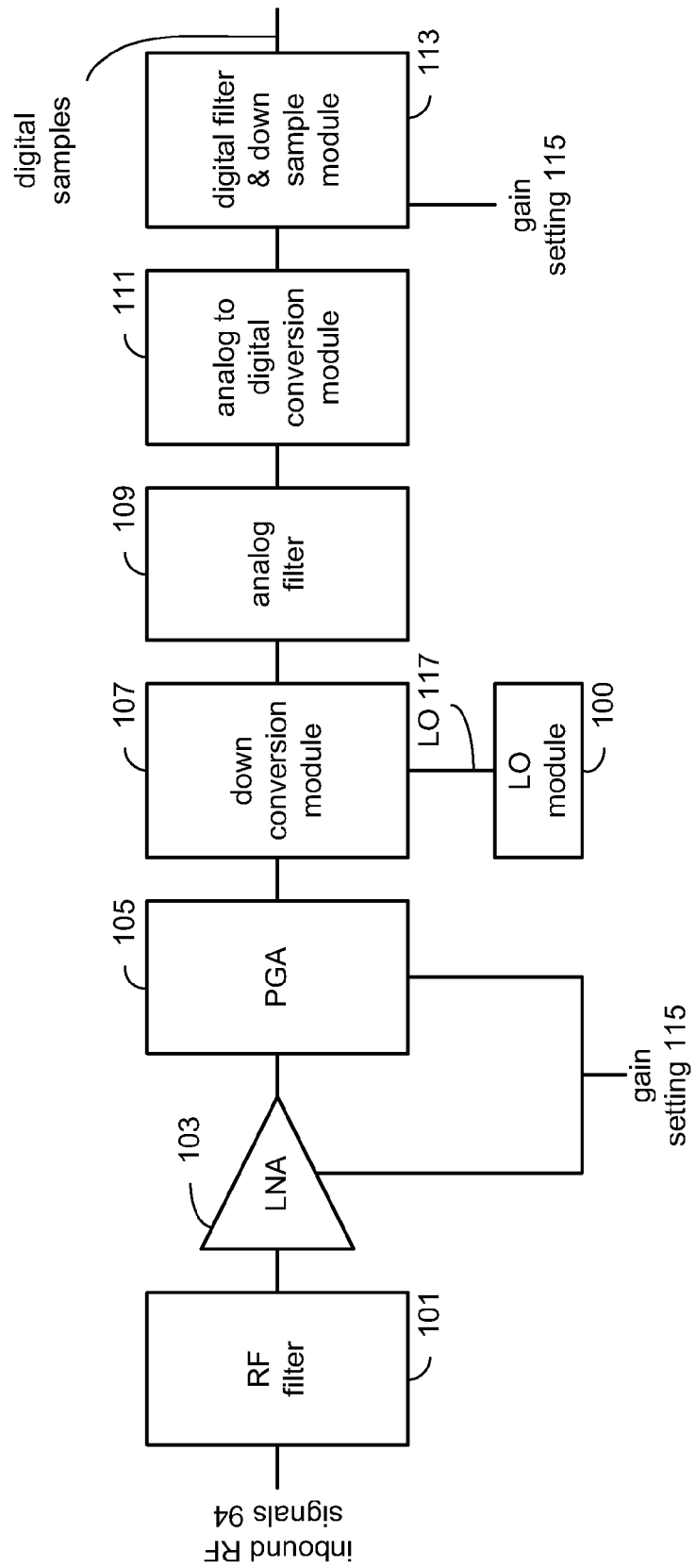
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
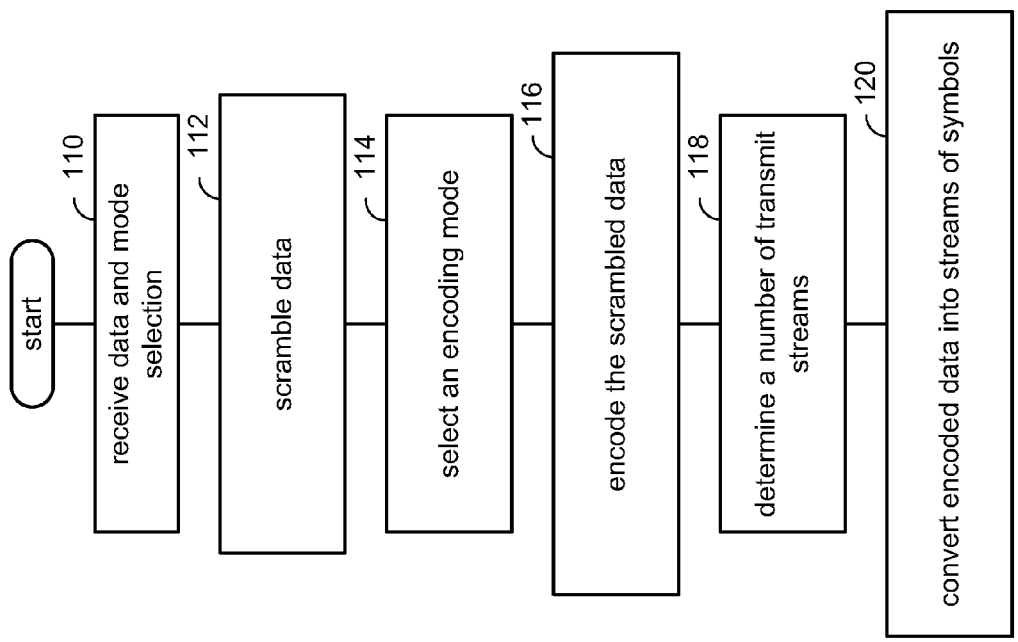
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
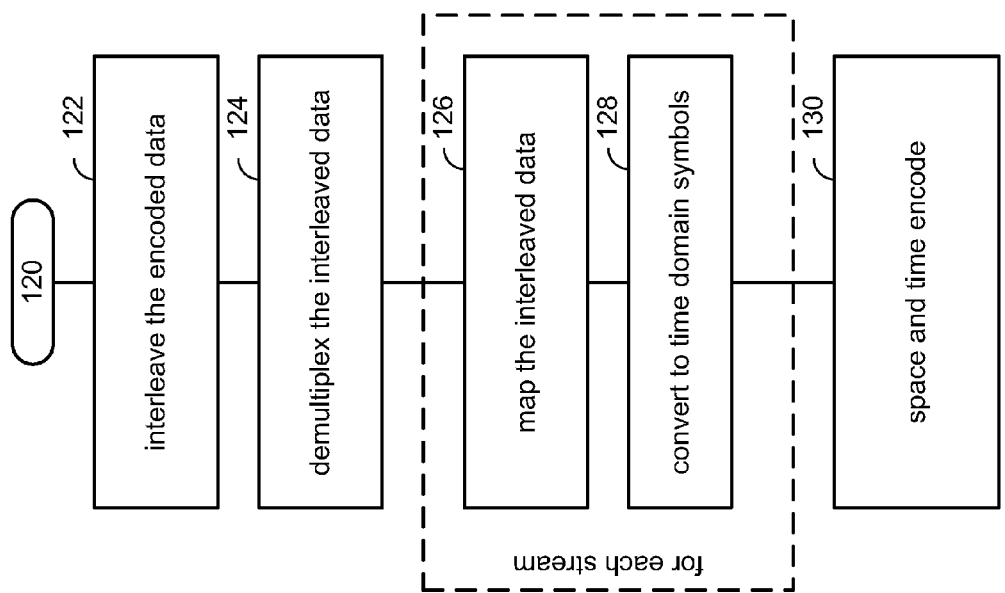
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
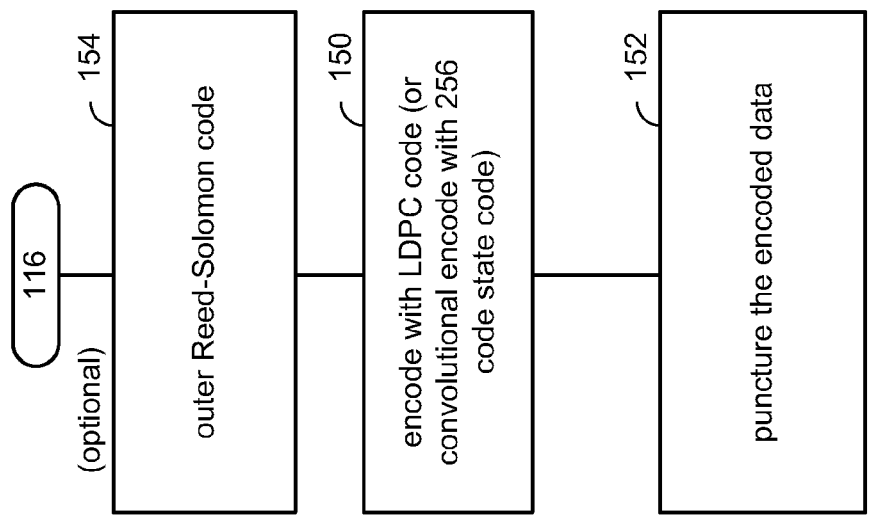
FIGS. 7-9 are diagrams illustrating various embodiments for encoding the scrambled data.
Figure 8:
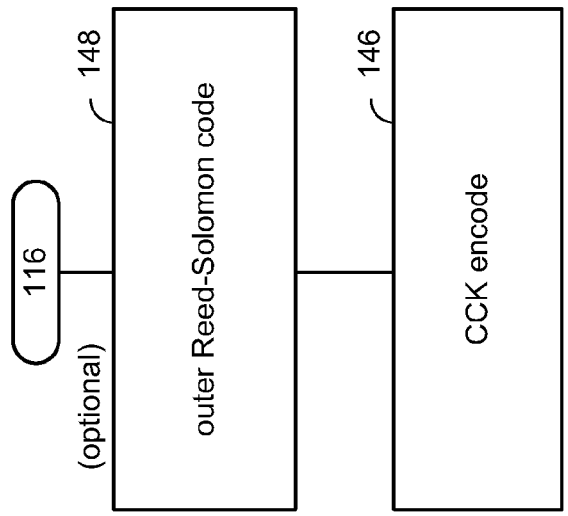
Figure 7:
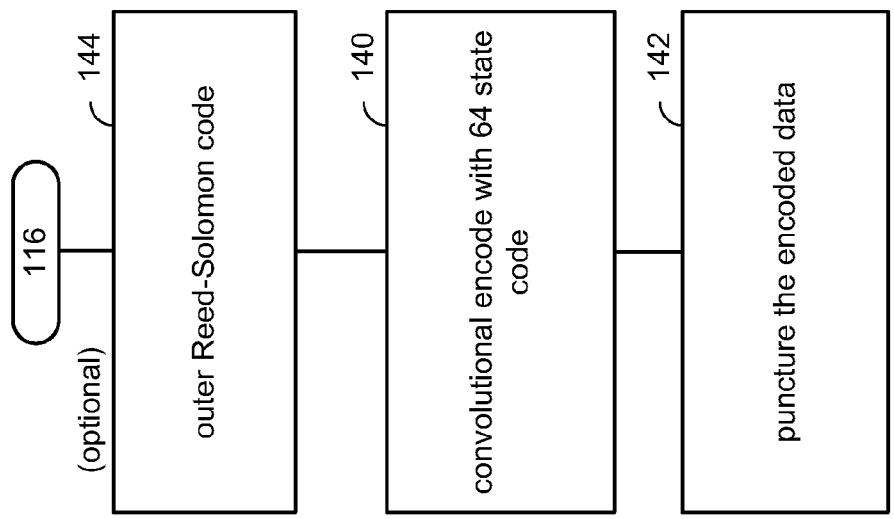

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
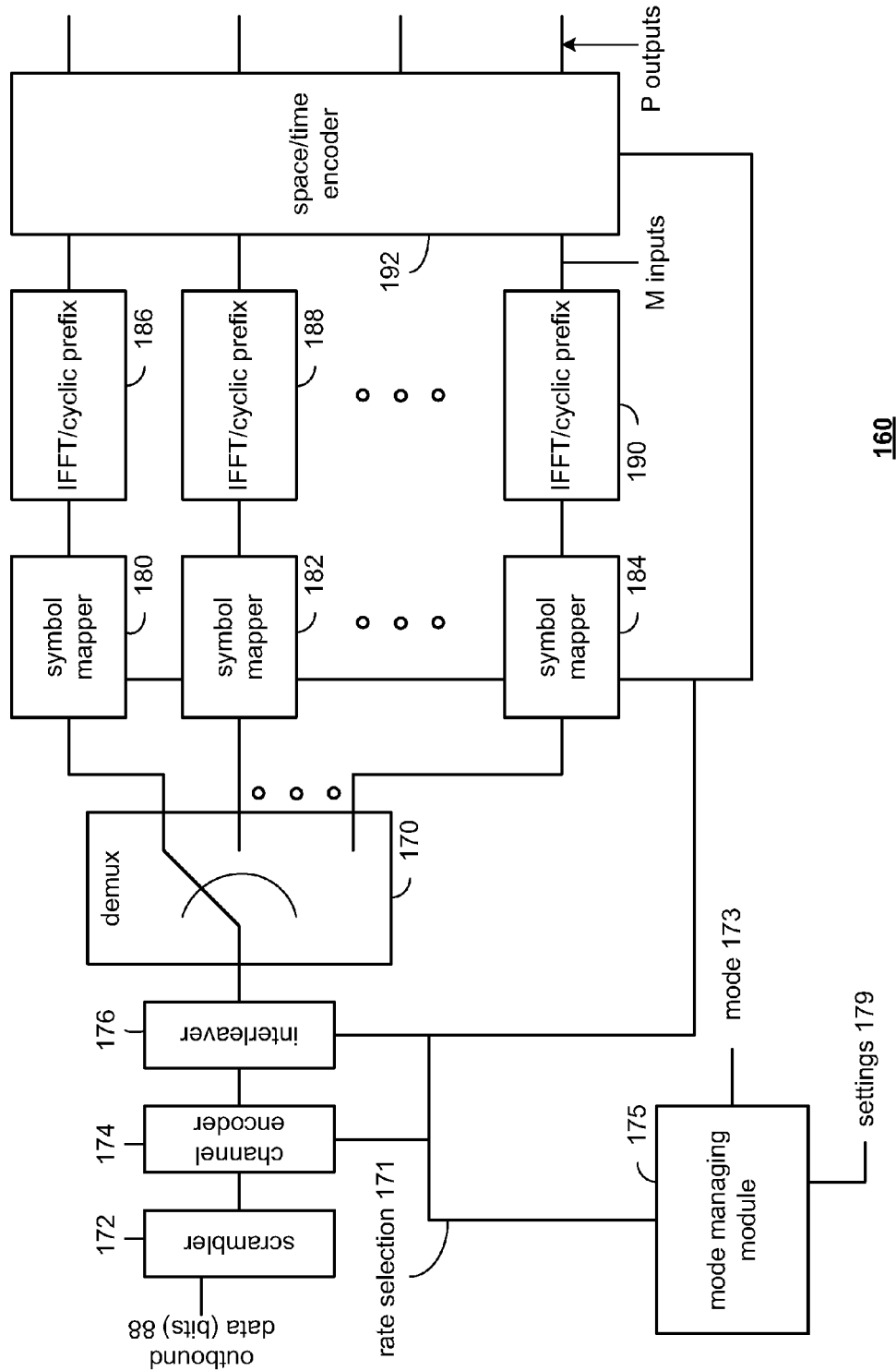
FIGS. 10A and 10B are diagrams illustrating embodiments of a radio transmitter.
Figure 10B:
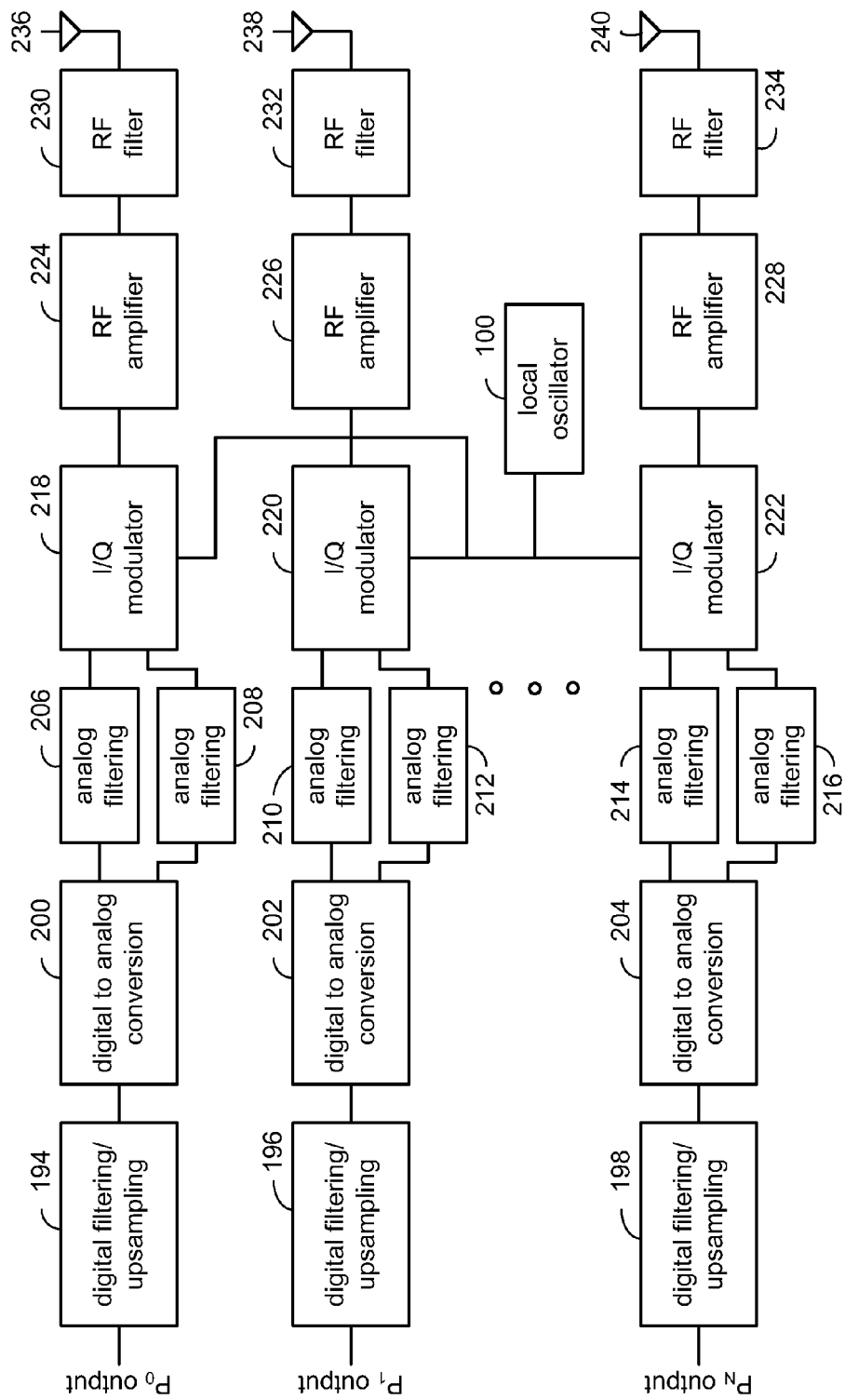

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \cdots & c_{2M-1} & c_{2M} \\ -c_2^* & c_1^* & -c_4^* & c_3^* & \cdots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
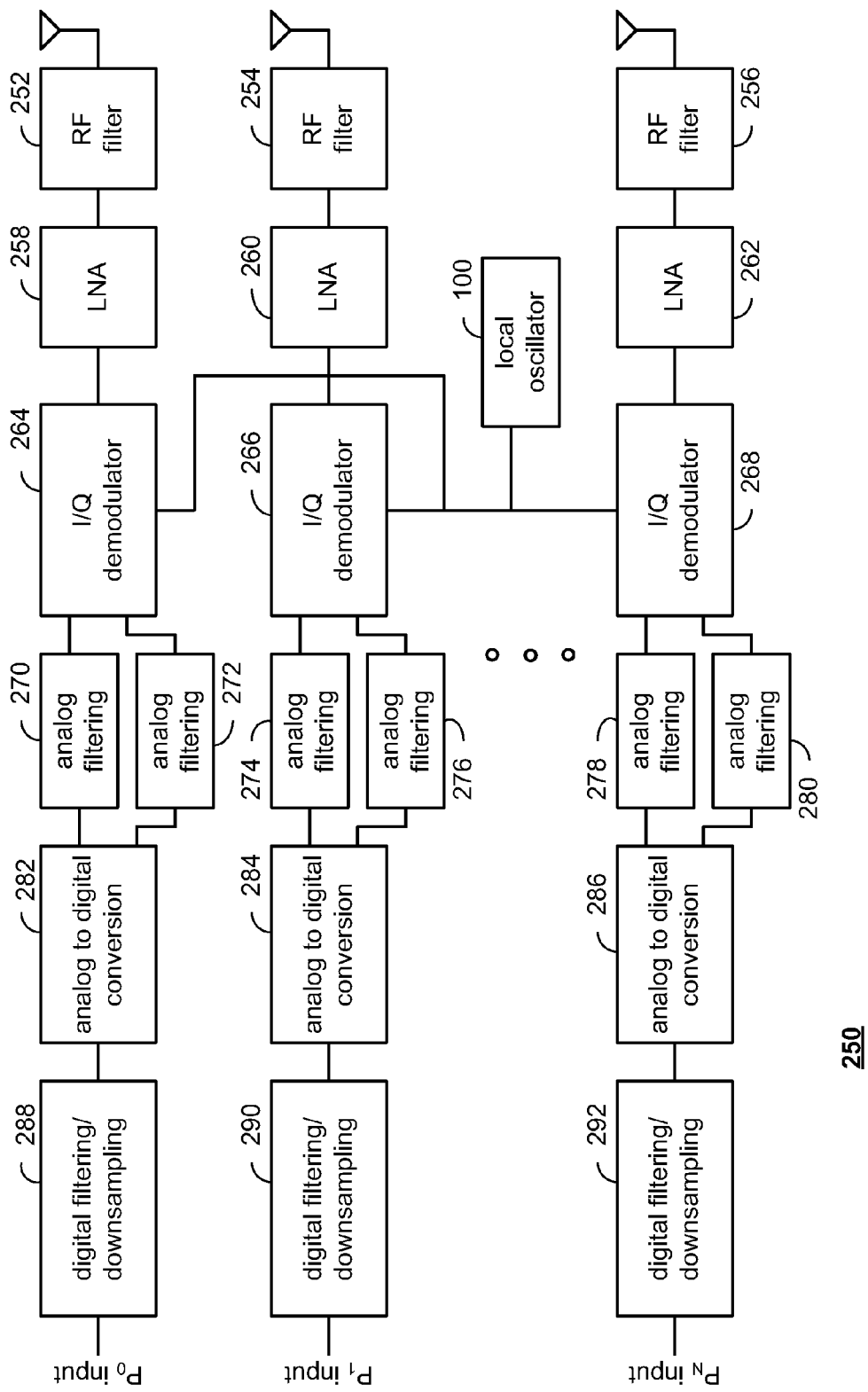
FIGS. 11A and 11B are diagrams illustrating embodiments of a radio receiver.
Figure 11B:
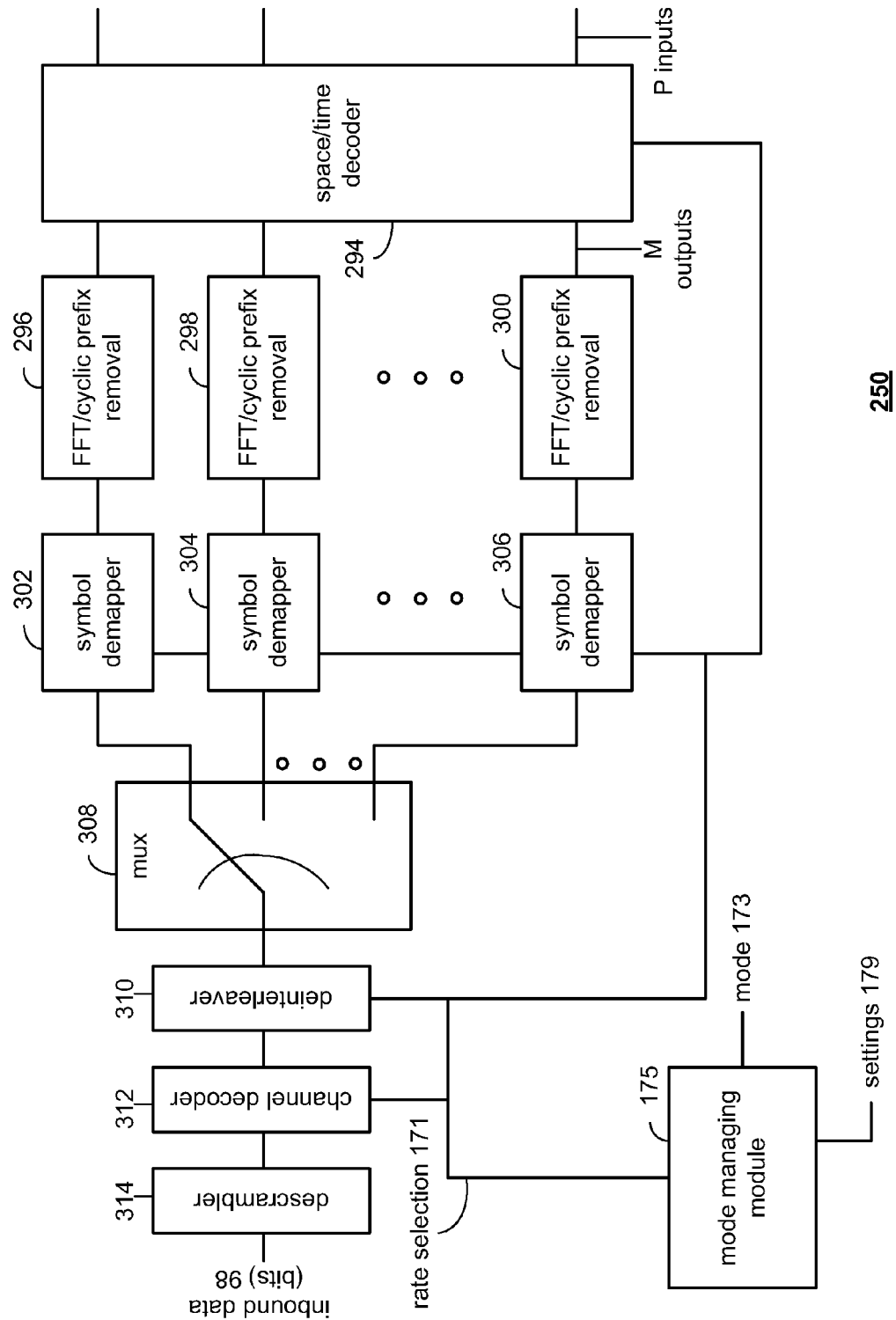

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
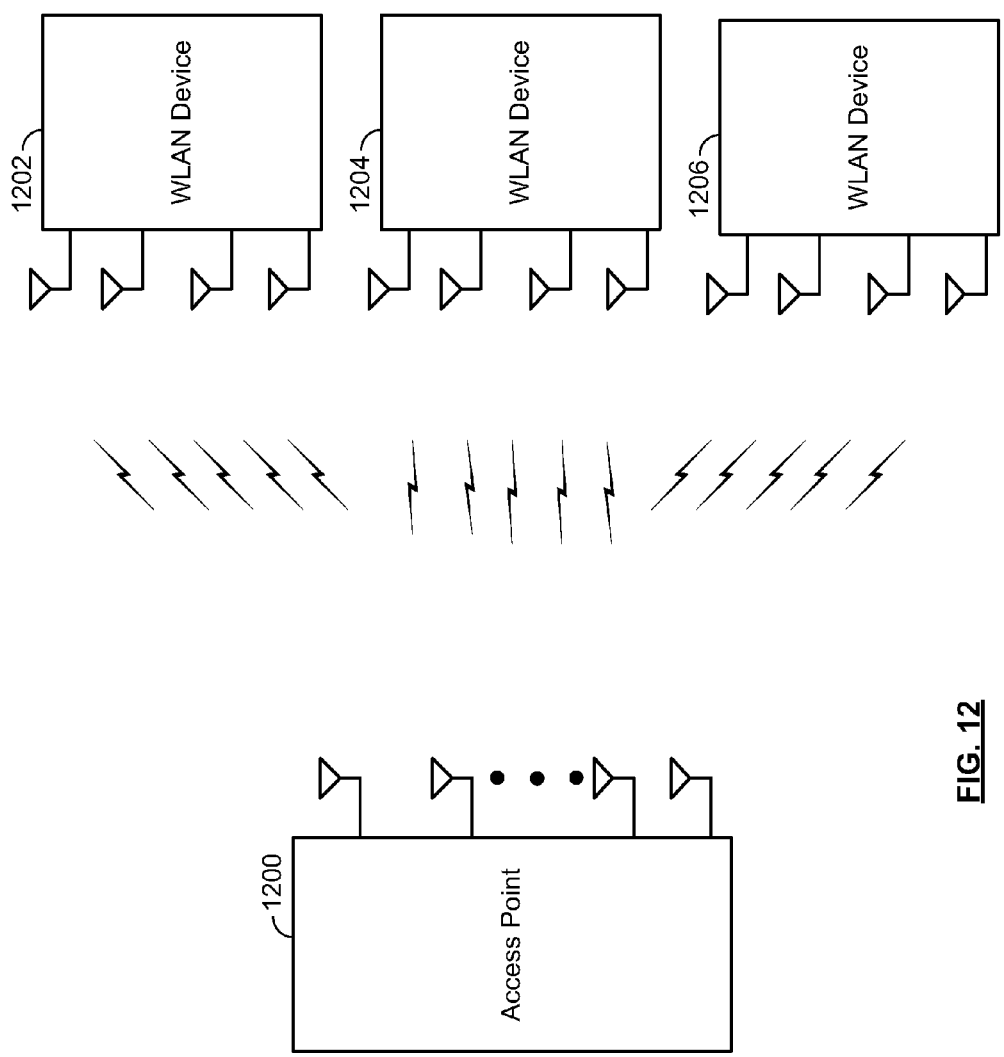
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
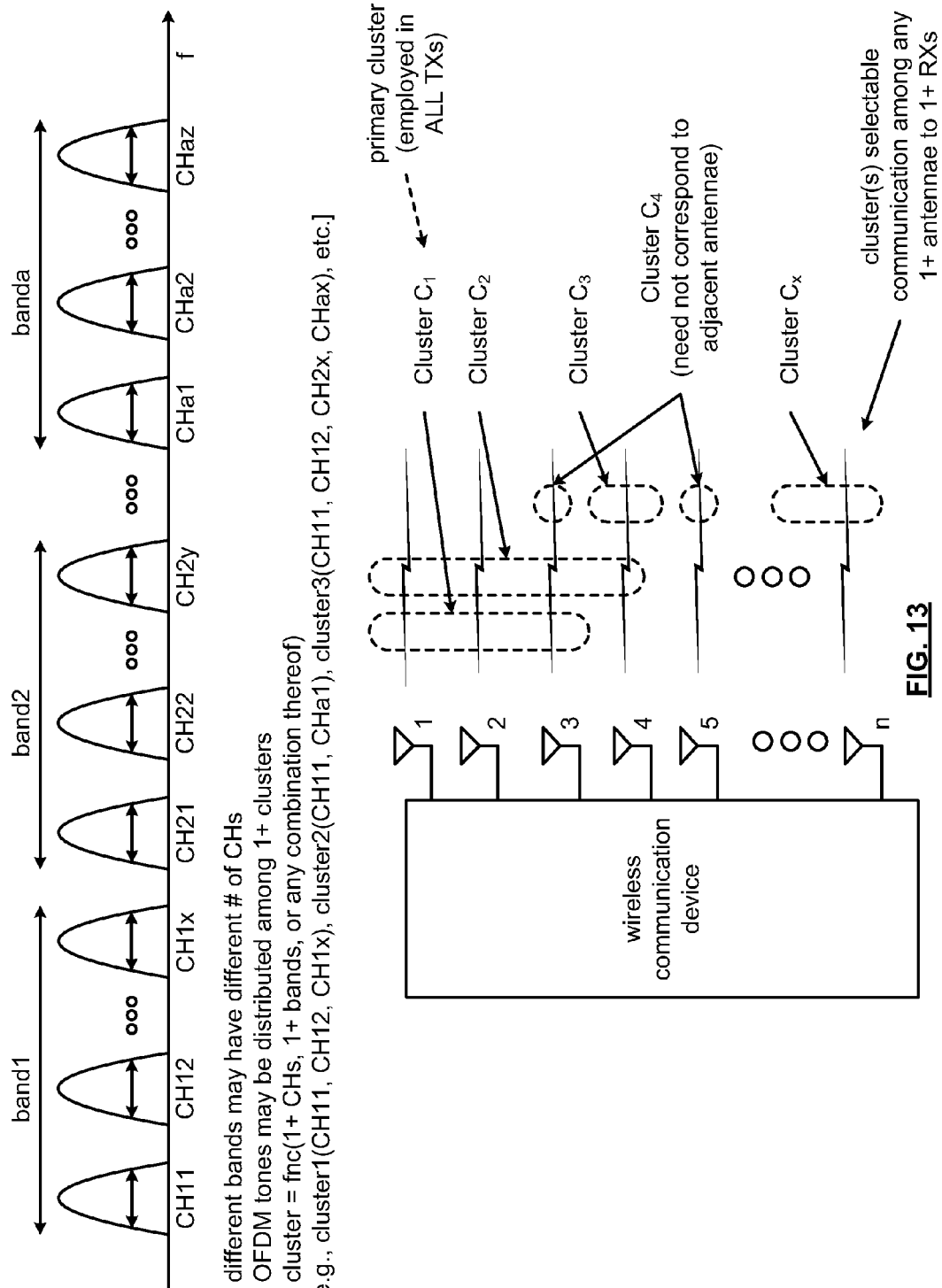
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

In accordance with many of the embodiments describe herein, reference is made to directing control of a communication medium that is to be used by multiple wireless communication devices. Generally, the communication medium may be referred to as a medium, and in the context of wireless communication devices, the medium is space itself and one or more frequency portions thereof for use in supporting wireless communications between various wireless communication devices.

Also, with respect to the various clusters being employed in accordance with the communications presented herein, one of the clusters (which of course may include one or more channels within one or more bands) may be designated as a primary cluster. Such a primary cluster may be one of the clusters that is used during each transmission and also by all of the wireless communication devices within the communication system.

Generally speaking, a multi-user super-frame (MU-SF) may be viewed as a period of time during which access to the medium is controlled by the MU-SF owner. Such a MU-SF owner may be an access point (AP) within a communication system that includes one or more APs and one or more wireless stations (STAs). In some embodiments, an AP may be viewed as a transmitting wireless communication device, and the one or more STAs may be viewed as receiving wireless communication devices (e.g., with respect to the perspective of a MU-SF owner). Of course, it is noted bi-directional communication may be supported between such an AP and the STAs.

With respect to the medium, the access thereto, on the available clusters, may be divided by the MU-SF owner into periods of differing access types. Generally, in one embodiment, such access to the medium may be divided into contention free and contention based means for effectuating medium access. In one instance, the contention free means for effectuating medium access may generally be referred to as a scheduled access operational mode. In another instance, the contention based means for effectuating medium access may generally be referred to as a carrier sense multiple access (CSMA) operational mode. Such CSMA may also be performed in accordance with collision avoidance, as referred to as CSMA/CA, including the enhancement of the collision avoidance mechanism therein. One example of performing such CSMA operation is in accordance with IEEE 802.11 enhanced distributed channel access (EDCA), the basis protocol in IEEE 802.11e.

It is also noted that while certain embodiments herein describe respective wireless communication devices that operate in accordance with a first or a second operational mode, certain of the wireless communication devices herein can operate in accordance with both the first and the second operational modes. For example, when a first wireless communication device accesses the medium in accordance with a first operational mode, and a second wireless communication device accesses the medium in accordance with a second operational mode, it is also noted that the first wireless communication device may also be operative in accordance with a second operational mode, and/or the second wireless communication device may also be operative in accordance with the first operational mode. That is to say, certain of the wireless communication devices may be operative in accordance with both of the operational modes, while other of the wireless communication devices may be operative in accordance with only one of the operational modes.

Certain of the respective wireless communication devices that may be allowed to transmit at different times within the MU-SF, but that do not have control of the MU-SF timing, may generally be referred to as MU-SF users.

During the scheduled operational mode time periods, access to the medium is governed by the MU-SF owner in accordance with one or more embodiments of time division multiple access (TDMA)/multi-user multiple input multiple output (MU-MIMO)/orthogonal frequency division multiplexing (OFDM) fashion. For example, such medium access may be performed in accordance with a pseudo-static TDMA/MU-MIMO/OFDMA, a dynamic TDMA/MU-MIMO/OFDMA, or other implementation thereof. In accordance with such scheduled operational modes of operation, non-repeating allocations of medium access by the various wireless communication devices may be performed.

During a contention based operation mode (e.g., a CSMA portion of a MU-SF), an extension to the current CSMA mechanism (such as in accordance with IEEE 802.11) may be adopted to control the access of more than one cluster by the MU-SF owner and the MU-SF users. Any of a variety of possible means of operation may be used. For example, a mechanism employing 40 MHz cluster access in accordance with the IEEE 802.11 amendment TGn may be performed, by performing CSMA/CA on a primary cluster. Within this operation, backoff is counted down based on the condition of the primary cluster. Then, when backoff reaches ZERO, the other X−1 clusters are monitored only for the past PIFS (PCF inter-frame space) for the 5 GHz band and DIFS for the 2.4 GHz band, where N is the total number of clusters, and X is a minimum number of clusters for which access is being attempted. If X out of N clusters are clear, then transmissions may begin for both the forward and reverse directions Another mode of operation, in accordance with CSMA, may perform parallel CSMA operation on all N clusters employed within the communication system. Backoff is selected and counted down on each of the respective N clusters based on the activity on that cluster. For example, if X of the N clusters have completed their respective backoffs, and if all X of those clusters are indicating IDLE, then a transmission that uses 0−X of those X clusters may commence, again, where N is the total number of clusters, and X is a minimum number of clusters for which access is being attempted.

In yet another mode of operation, individual CSMA may be performed respectively on all N clusters for individual transmissions to be performed on all of the clusters. For example, for each cluster Y of the N available clusters, if cluster Y is clear, and a packet is waiting for transmission, then transmission can begin on cluster Y.

When operating in accordance with a MU-SF, when it is desirable to terminate the scheduled access portion (e.g., see embodiments such as FIG. 16B, FIG. 39B, etc.), a contention free end (CF end) signal may be transmitted from the MU-SF owner to other of the wireless communication devices within the communication system to truncate an unused portion of a periodic MU-SF. As such, operation of the communication system may then transition to a contention based operational modes (e.g., CSMA) where various of the wireless communication devices compete for access to the medium.

FIG. 14A and FIG. 14B are diagrams illustrating various embodiments of general timing as may be effectuated using multi-user super-frames (MU-SFs) to effectuate medium access in accordance with various operational modes. Within these diagrams, $T_{sf}$ is the super frame time, or the duration of a MU-SF. The super frame time does not have to be a fixed value, but may be modified or changed over time. The super frame times of different MU-SFs may be different. Each of $T_{sched1}$ and $T_{sched2}$ are the scheduled access times, which may be located at the beginning of a MU-SF (e.g., FIG. 14A). Alternatively, such scheduled access times may be located at the ends of respective MU-SFs (e.g., FIG. 14B). The length and MU-SF user access ordering may be different based on traffic and cluster requirements. In many of the embodiments described herein, for illustrative purposes, $T_{sched1}$ and $T_{sched2}$ are pictorially shown as having the same length, though it is again noted that they may have different lengths and values without departing from the scope and spirit of the invention. Each of $T_{CSMA1}$ and $T_{CSMA2}$ are the times at which unscheduled transmissions happen within a respective MU-SF (e.g., in accordance with contention based medium access such as in accordance with CSMA).

Figure 15:
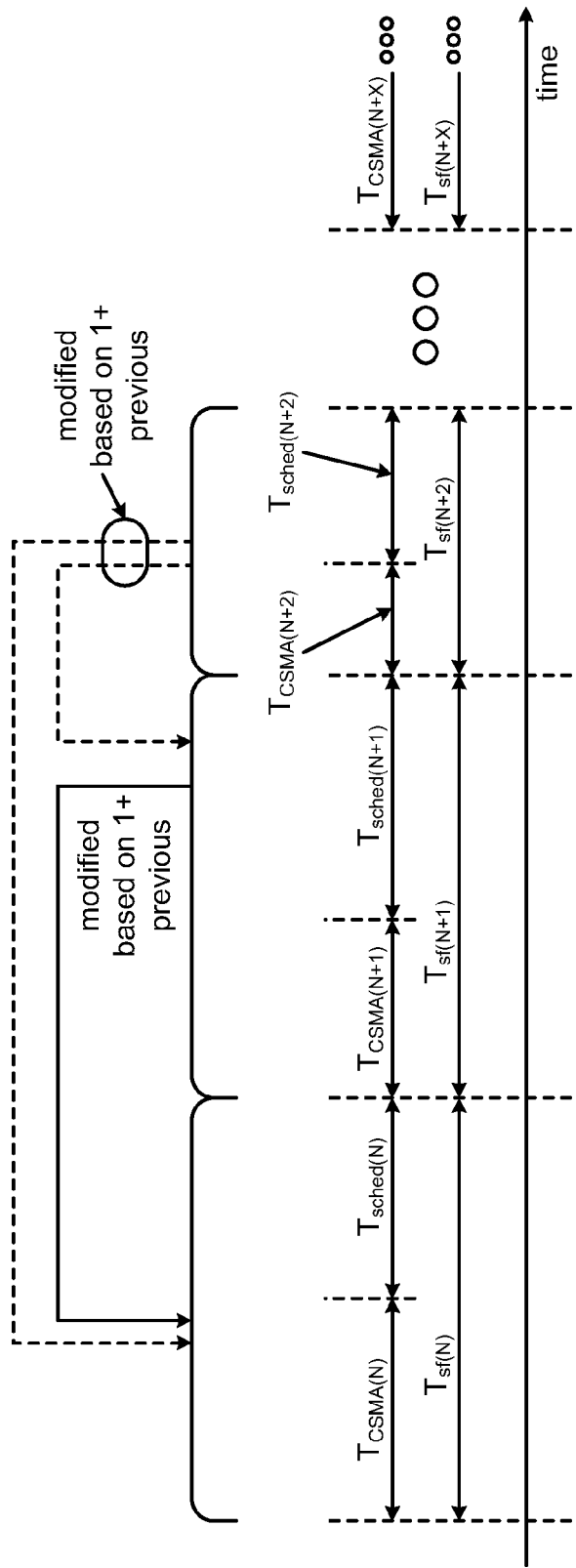
FIG. 15 is a diagram illustrating an embodiment of variation among various MU-SFs including respective periods therein.

FIG. 15 is a diagram illustrating an embodiment of variation among various MU-SFs including respective periods therein. This diagram shows how values associated with a subsequent MU-SF maybe modified and different than values associated with a previous MU-SF. In some instances, certain of the values associated with a subsequent MU-SF are determined based on values associated with one or more previous MU-SFs. As can be seen in this diagram, the respective lengths of scheduled access times, contention based/unscheduled medium access times, MU-SFs, etc. may vary from frame to frame. Such modification of such values on a MU-SF basis may be predetermined, adaptive (in accordance with one or more operational parameters), or some combination thereof.

FIG. 16A and FIG. 16B are diagrams illustrating normal operation in comparison with use of a contention free (CF) end signal to transition between scheduled access and carrier sense multiple access/collision avoidance (CSMA/CA). When a transmitting wireless communication device (e.g., an OFDMA/MU-MIMO transmitter) realizes that it does not need to use the all of the scheduled portion of a MU-SF in which medium access is contention free, it may transmits a contention free end (CF end) signal to the various wireless communication devices to release the medium access by the various wireless communication devices in accordance with a contention based operational mode (e.g., in accordance with CSMA operation). As can be seen, the scheduled portion of a MU-SF can then be cut short thereby extending the period of the contention based operational mode within a respective MU-SF.

FIG. 17 is a diagram illustrating an embodiment of various wireless communication devices being partitioned into multiple capability sets (CSs) and their respective operation within one or more MU-SFs. For example, certain of the wireless communication devices are not capable to operate in accordance with multi-user (e.g., scheduled) means. Such a wireless communication device having capabilities in accordance with a previous technology set (e.g., generally referred to as a legacy wireless communication device such as operating in accordance with TGn) may be unable to support operation in accordance with certain later generation communication protocols (e.g., TGac). As such, it can be seen that certain of the wireless communication devices may only operate during those periods of a MU-SF in which operation is performed in accordance with the contention based operational mode and/or the scheduled access operational mode. For example, those wireless communication devices that can operate in accordance with newer communication protocols (e.g., TGac), as well as being backward compatible with prior communication protocols (e.g., TGn), may be able to operate during all of the MU-SF (e.g., during both the portions therein); it is noted that such wireless communication devices may of course having capabilities associated with the prior communication protocols (e.g., TGn) ensuring such backward compatibility.

However, those wireless communication devices that can only operate in accordance with prior communication protocols (e.g., TGn) may be able to operate only during those contention based medium access portions (e.g., CSMA) of the MU-SF.

Certain aspects corresponding to any of the particular MU-SFs may be determined by the MU-SF owner. In some instances, the respective MU-SFs may be periodic, such that the periodicity thereof may be described in a MU-SF announcement frame. In one embodiment, a MU-SF announcement frame may be provided from the MU-SF owner to various of the wireless communication devices, and subsequent MU-SFs may be defined therein. For example, a MU-SF announcement frame can be provided from a MU-SF owner, then operation in accordance with a plurality of subsequent MU-SFs may be performed among the wireless communication devices. Also, the MU-SF duration or one or more subsequent MU-SFs may be announced in a MU-SF announcement frame as well.

It is noted that such an MU-SF announcement frame may be a separate management frame or the MU-SF announcement frame may be a portion of a frame that includes other components therein such as data, control, management, and/or other types of frame portions therein. In accordance with various embodiments that describe generating a MU-SF announcement frame, such an MU-SF announcement frame may be a separate and independent frame, or it may be aggregated with data, control, management, and/or other types of frame portions. In some embodiments, if a frame includes at least a MU-SF announcement frame portion therein, then the frame may be described generally as being a MU-SF announcement frame.

Also, such a MU-SF announcement frame may be used to quiet the network to allow maximum accessibility on the clusters that are used by the MU-SF users. Such operation may allow for faster assumption of control of the maximum number of clusters by the MU-SF users. Also, the MU-SF announcement frame may also pre-announce MU-SFs coming subsequently in the future. For example, periodically recurring MU-SFs may be provided such that each MU-SF begins with a medium control that forces all of the wireless communication devices (users) to quiet all of the clusters employed therein. One such medium control example may involve employing a scheduled quiet period that coincides with the first portion of the MU-SF (e.g., contention free period (CFP) or quiet element are examples). Another such medium control example may involve employing a sequence of per-cluster reservation frames that gradually take control of all clusters.

A MU-SF announcement frame may include certain instructions or information to direct the operation by which the various wireless communication devices within the communication system are to operate. As an example, a MU-SF announcement frame may include information corresponding to which MU-SF clusters are to be employed by one or more of the wireless communication devices. Also, such a MU-SF announcement frame may particularly describe which of the MU-SF users are to operate in accordance with the respective parameters therein. One such means for identifying for which of the wireless communication devices the MU-SF announcement frame is intended may include using an associated ID (AID), which may be a shortened, but unique substitute for a full 48-bit MAC address (i.e., one-to-one mapping of 48 bit address to say, 11-bit address). Of course, a MAC address may be employed to identify for which of the wireless communication devices the MU-SF announcement frame is intended as well. Other details that may be included within such a MU-SF announcement frame may include the MU-SF timing (e.g., the order, the sequence, etc.), as well as any MU-SF periodicity (if any).

The MU-SF announcement frame may be provided to the wireless communication devices in accordance with any number ways. For example, the MU-SF announcement frame can be part of the beacons or probe responses such as provided by an access point (AP). In other embodiments, MU-SF announcement frame can be transmitted as a separate frame (e.g., a multi-user multiple input multiple output (MU-MIMO) frame, an orthogonal frequency division multiple access (OFDMA) frame, and/or a combination thereof).

With respect to the timing as may be described within a respective MU-SF announcement frame, after the passage of every $T_{sf}$ ms, if the first portion of the MU-SF is a scheduled portion, then the first scheduled MU-SF transmitter starts contending for available clusters. At any given time, the cluster BUSY/IDLE condition for each cluster is the BUSY/IDLE condition of that cluster during the previous time period, $DT_1$, for the 5 GHz band and time period, $DT_2$, for 2.4 GHz. Such time periods may be different on different channels or clusters in 5G or 2G.

If X out of N clusters become clear, a MU-SF user transmission (e.g., a MU-MIMO/OFDMA transmission) may be made on those 0–X–1 of those X clusters for a duration to be determined by the transmitter (e.g., AP). The duration of scheduled transmission is conveyed to the recipients. A transmission on any given cluster Y, of the X clusters, might complete before any given transmission on another of the X clusters completes, and a new transmission on cluster Y is allowed to begin at that time. A new transmission that begins in the middle of the MU-MIMO/OFDMA transmission might need to include new information regarding acknowledgement, possibly also reverse data, timing, any aggregation of data with acknowledgement, etc.

Also, if one or more additional clusters become IDLE during the current MU-MIMO/OFDMA transmission, then a new transmission may begin on those one or more newly idle clusters. Of course, the current transmission may also bring in the one or more newly idle clusters. Transmissions on different clusters may have different ending times, so that transmissions on different clusters may have independent PHY header information regarding those end times. Training may be transmitted on any of the clusters (e.g., such as in accordance with channel sounding, feedback, etc. with respect to any of the communication paths between various wireless communication devices). When the first scheduled MU-SF user has gained access to the medium, then the MU-SF has started.

All MU-SF users (e.g., including a MU-MIMO/OFDMA transmitting wireless communication device and any receiving wireless communication devices) may have a timer as a reference to keep track of super frame timing. If a timing reference is used to initiate the MU-SF, then the MU-SF or contention for the start of MU-SF begins as indicated by the MU-SF owner.

In another instance, if no timer is used or in case of the presence of non MU-SF users that operate using a compatible communication protocol, such as IEEE 802.11, then an IEEE 802.11-like airtime reservation mechanism (e.g., clear to send (CTS) to self (being X-cluster wide) can be used to ensure that the scheduled portion of a MU-SF is protected from interfering transmissions. If the MU-SF owner uses any such airtime reservation mechanisms to establish control of the medium, then once control has been established by the MU-SF owner, the MU-SF has started.

Each MU-SF user transmission may be followed by a period used for scheduled/polled ACK/BACK transmission and/or scheduled/polled data transmission in the reverse direction. As will be seen in certain embodiments, ACK/BACK may be aggregated with data.

One of the considerations with respect to operating in accordance with MU-SFs as described herein, there should be consideration for maintaining MU-SF integrity in the presence of non-MU-SF users. As may be understood, not all of the wireless communication devices within a communication system may be operative with or compatible for operating with such MU-SF functionality. For example, when non-MU-SF users are present, the signaling for periodic MU-SFs may be ignored by the non-MU-SF users because it is not known. Coordination among the MU-SF owner and the respective MU-SF users may employ various mechanisms to ensure MU-SF integrity. Among such operations, one manner is to assign a "primary cluster" to one of the clusters that is used by the MU-SF users. Such a "primary cluster" may be employed for all transmissions within the communication system to ensure that all such wireless communication devices therein can always detect and sense activity within the communication system.

By providing that the MU-SF owner can control membership to the wireless communication devices within the basic service set (BSS), then the MU-SF owner can ensure that any BSS members that are not MU-SF users will only communicate using the primary cluster(s). The MU-SF owner can further ensure control of the medium by requesting to MU-SF users that acknowledgements and other airtime reservation generating frames are frequently (or always) transmitted on the primary cluster. In accordance with the definition of cluster as provided herein (e.g., with respect to FIG. 13), a cluster may be any combination of one or more channels within one or more bands. Of course, any combination of clusters may also be characterized as a "primary cluster set", and such "primary cluster set" may be used in accordance with such operations. In one instance, some non-MU-SF users may be wireless communication devices that operate on more than one cluster. Also, in cases where all members of the BSS are MU-SF users, the primary cluster does not need to be restricted by any non-MU-SF user constraints employed within the communication system.

Various and multiple examples are provide herein for various embodiments of means for performing medium access that may be performed in accordance with certain aspects of the invention including order, sequence, timing, periodicity, cluster, signaling format, antenna configuration, etc. It is also noted that these specific examples and embodiments are not exhaustive, and the principles described herein may be adapted to accommodate any desired configuration and manner of means for performing medium access in accordance with any of these and other selectable principles.

In some of the diagrams employed herein, STA is generally used to refer to a receiving wireless communication device (where STA1 corresponds to a first receiving wireless communication device, STA2 corresponds to a second receiving wireless communication device, etc.). Generally, a transmitting wireless communication device that transmits such an MU-SF announcement frame can be an access point (AP), though a STA may also transmit such an MU-SF announcement frame to other STAs (and/or one or more AP) in certain embodiments.

After performing MU-SF announcement frame transmission, other operations may be performed including request to send (RTS) and clear to send (CTS) exchanges, various manners of data exchange may be performed in the various embodiments including using MU-MIMO data transmission, OFDMA data transmission, MU-MIMO/OFDMA data transmission, and correspondingly various manners of providing acknowledgements (ACKs) from the receiving wireless communication devices to the transmitting wireless communication device based thereon.

As mentioned elsewhere herein, adjacent and non-adjacent clusters may be used in transmissions that occur within a MU-SF (e.g., such OFDMA clusters may be continuous or discontinuous). As described with reference to the separation of various channels in different bands, there may be large gaps in frequency between adjacent bands. Again, any such cluster may be composed of one or more channels among one or more bands. A cluster may be as few as a single channel within a single band. For illustrative purposes, many of the embodiments depicting operation in accordance with scheduled access show operation using adjacent clusters. However, it is of course noted that certain of the clusters employed may be separated and non-adjacent. Also, with respect to such communications performed in accordance with scheduled access operation, the forward and reverse traffic may be aggregated packets or a single packet. Several of the diagrams provided herein show aggregated packets.

FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, and FIG. 33 are diagrams illustrating various embodiments of medium access among various wireless communication devices in accordance with scheduled access portions of respective MU-SFs.

Figure 18:
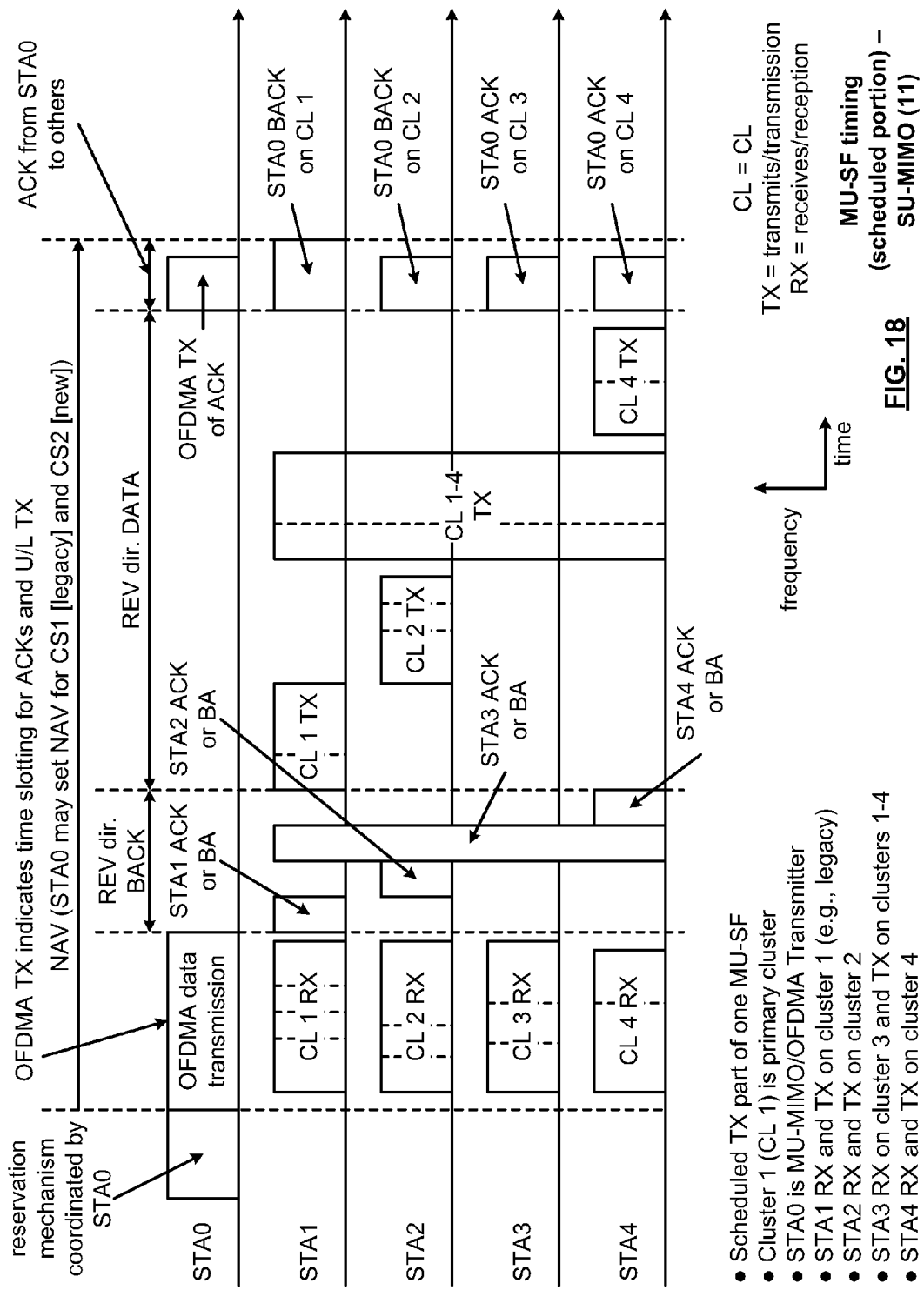
FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, and FIG. 33 are diagrams illustrating various embodiments of medium access among various wireless communication devices in accordance with scheduled access portions of respective MU-SFs.

Referring to FIG. 18, this embodiment shows MU-MIMO transmission such that the transmitting wireless communication device directs the various STAs to provide their respective CTSs in accordance with OFDMA signaling. The transmitting wireless communication device has OFDMA receive capability, and as such the CTSs can be provided to the transmitting wireless communication device in accordance with OFDMA signaling.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. Since STA transmits its ACK first, STA1 may be a legacy (e.g., TGn) wireless communication device. STA2 receives and transmits on cluster 2. STA3 receives on cluster 3 and transmits on clusters 1-4. For example, STA3 can operate by transmitting simultaneously on clusters 1-4. STA4 receives and transmits on cluster 4.

Figure 19:
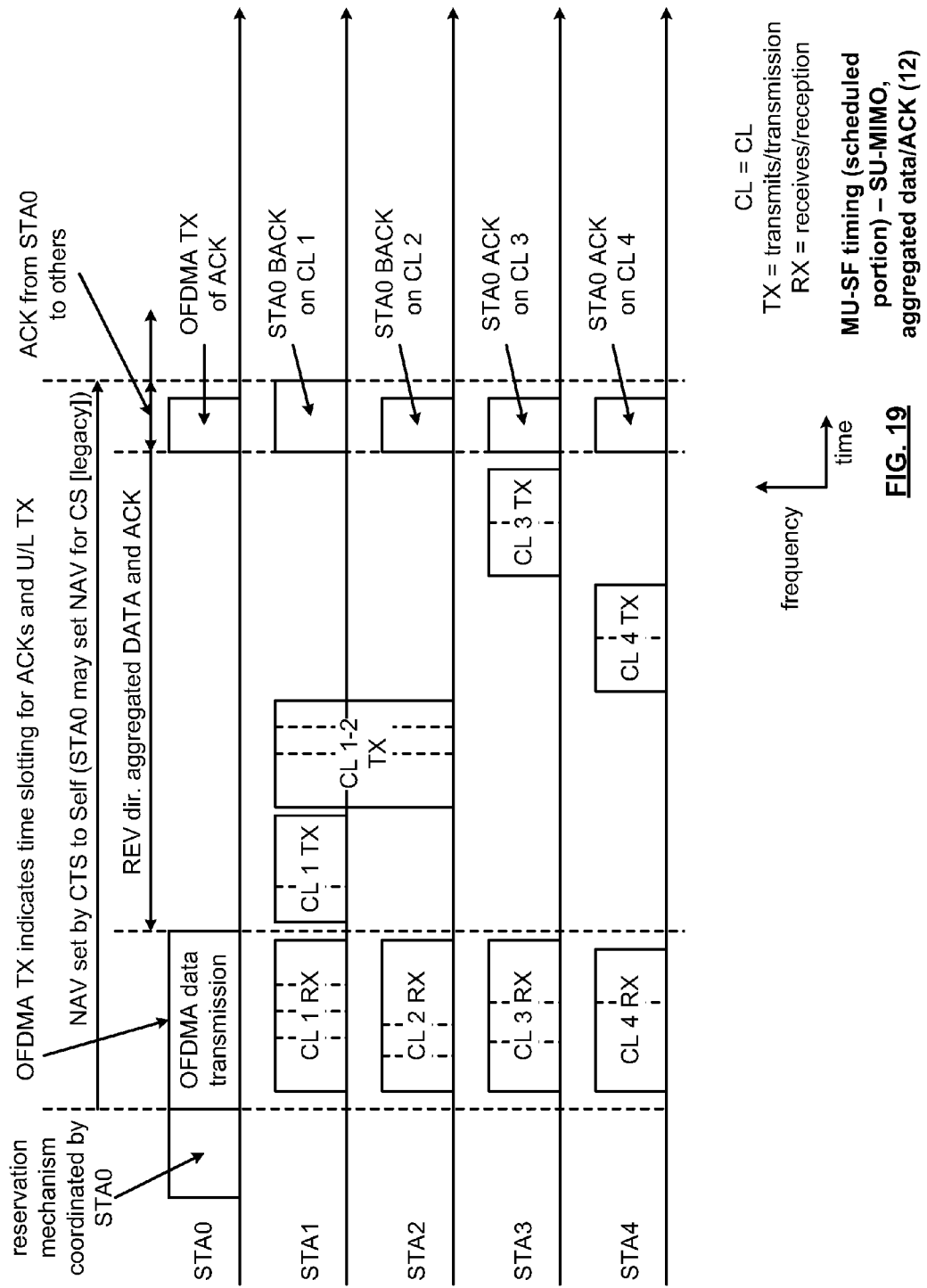

Referring to FIG. 19, this embodiment shows aggregation of data with ACKs being provided in the reverse direction from the STAs to the transmitting wireless communication device.

In this diagram, STA0 is again designated as being the transmitting wireless communication device (e.g., a MU-MIMO, OFDMA capable transmitter). STA1 receives and transmits on cluster 1. STA1 may be a legacy (e.g., TGn) wireless communication device. STA2 receives and transmits on clusters 1, 2. STA3 receives and transmits on cluster 3. STA4 receives and transmits on cluster 4.

Figure 20:
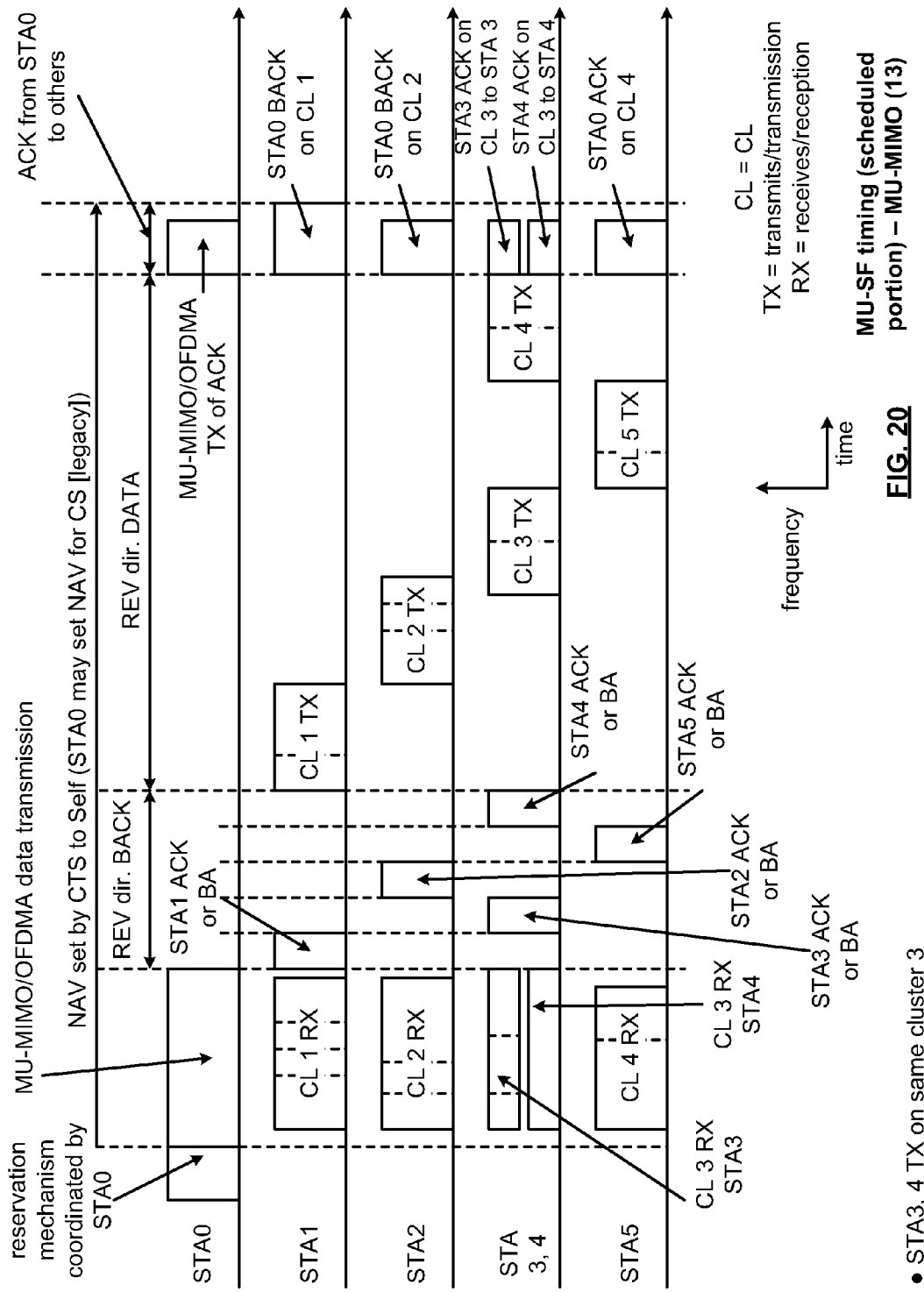

Referring to FIG. 20, this embodiment shows the uplink (U/L) data being provided serially from the STAs back to the transmitting wireless communication device.

In this diagram, STA0 is again designated as being the transmitting wireless communication device (e.g., a MU-MIMO, OFDMA capable transmitter). STA1 receives and transmits on cluster 1. STA1 may be a legacy (e.g., TGn) wireless communication device. STA2 receives and transmits on cluster 2. STA3 and STA4 operate using cluster 3, and also have MU-MIMO separation on cluster 3. STA5 receives and transmits on cluster 4.

Figure 21:
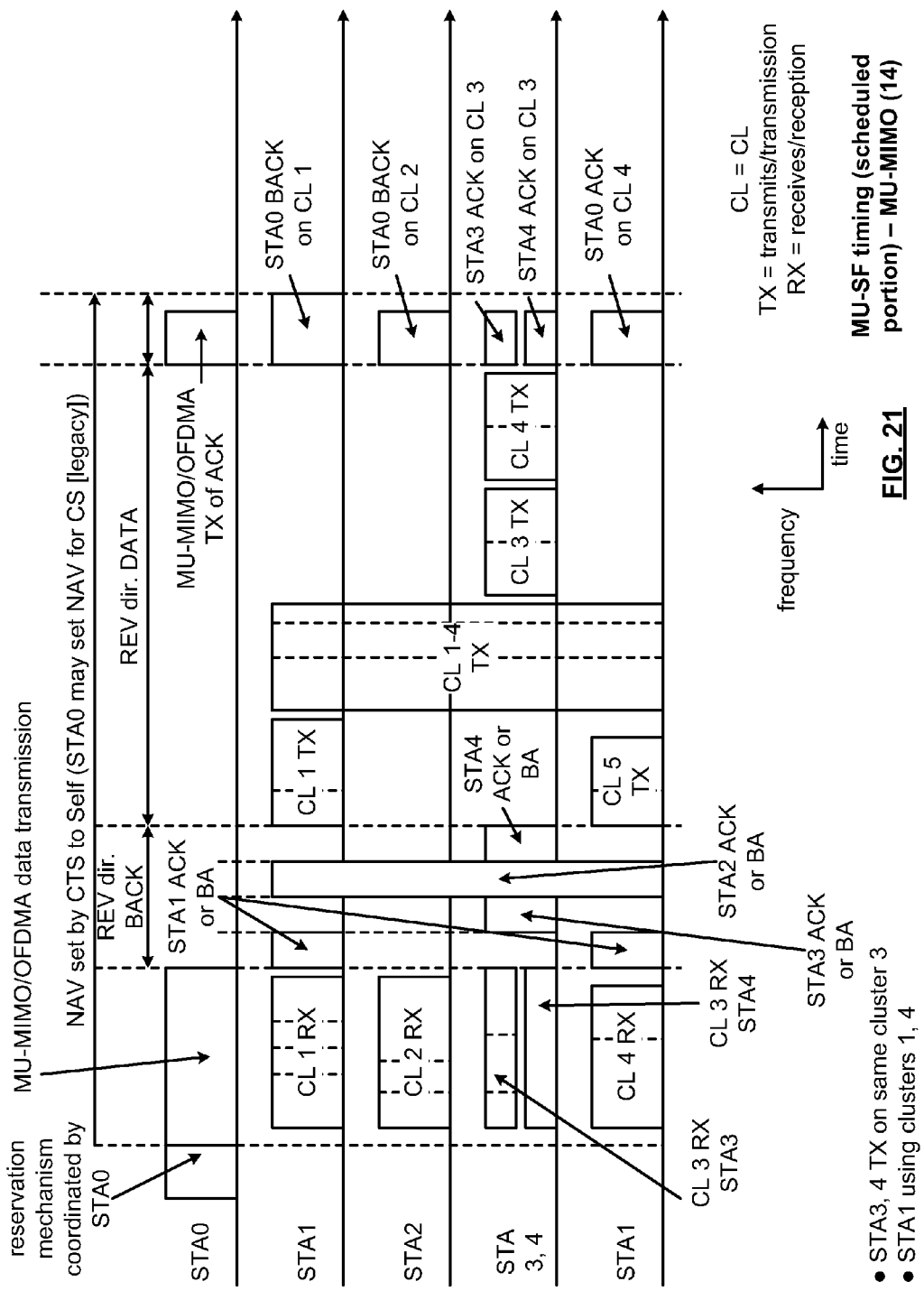

Referring to FIG. 21, this embodiment shows the U/L data transmission being performed in parallel with one another at the same time.

In this diagram, STA0 is again designated as being the transmitting wireless communication device (e.g., a MU-MIMO, OFDMA capable transmitter). STA1 receives and transmits on clusters 1, 4. STA1 may be a legacy (e.g., TGn) wireless communication device. STA2 receives and transmits on cluster 2. STA3 and STA4 operate using cluster 3, and also have MU-MIMO separation on cluster 3.

Figure 22:
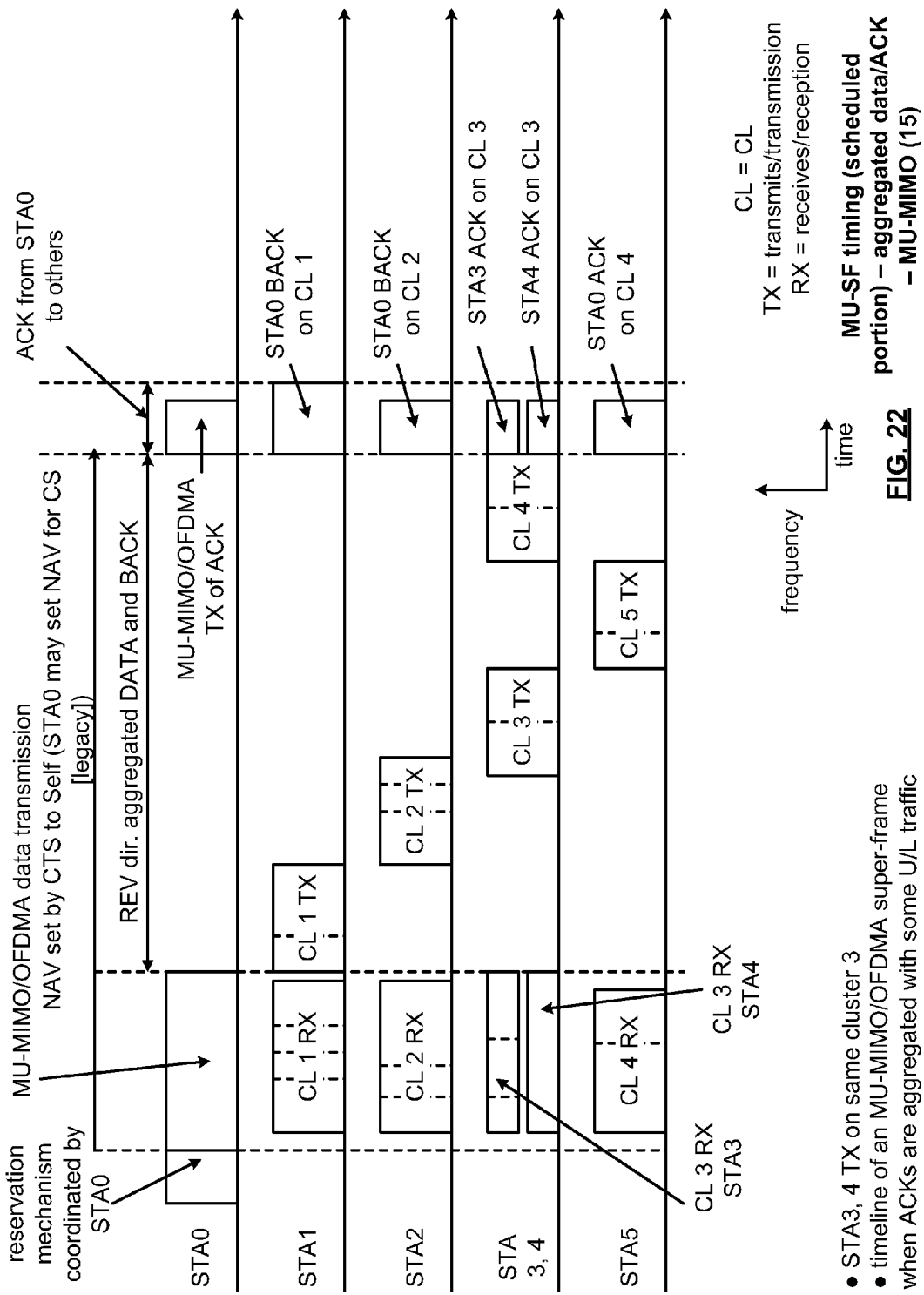

Referring to FIG. 22, this embodiment shows reverse direction data being aggregated with ACKs. In this diagram, STA0 is again designated as being the transmitting wireless communication device (e.g., a MU-MIMO, OFDMA capable transmitter). STA1 receives and transmits on cluster 1. STA1 may be a legacy (e.g., TGn) wireless communication device. STA2 receives and transmits on cluster 2. STA3 and STA4 operate using clusters 3, 4, and also have MU-MIMO separation on cluster 3. STA3 transmits on cluster 3, and STA4 transmits on cluster 4.

Figure 23:
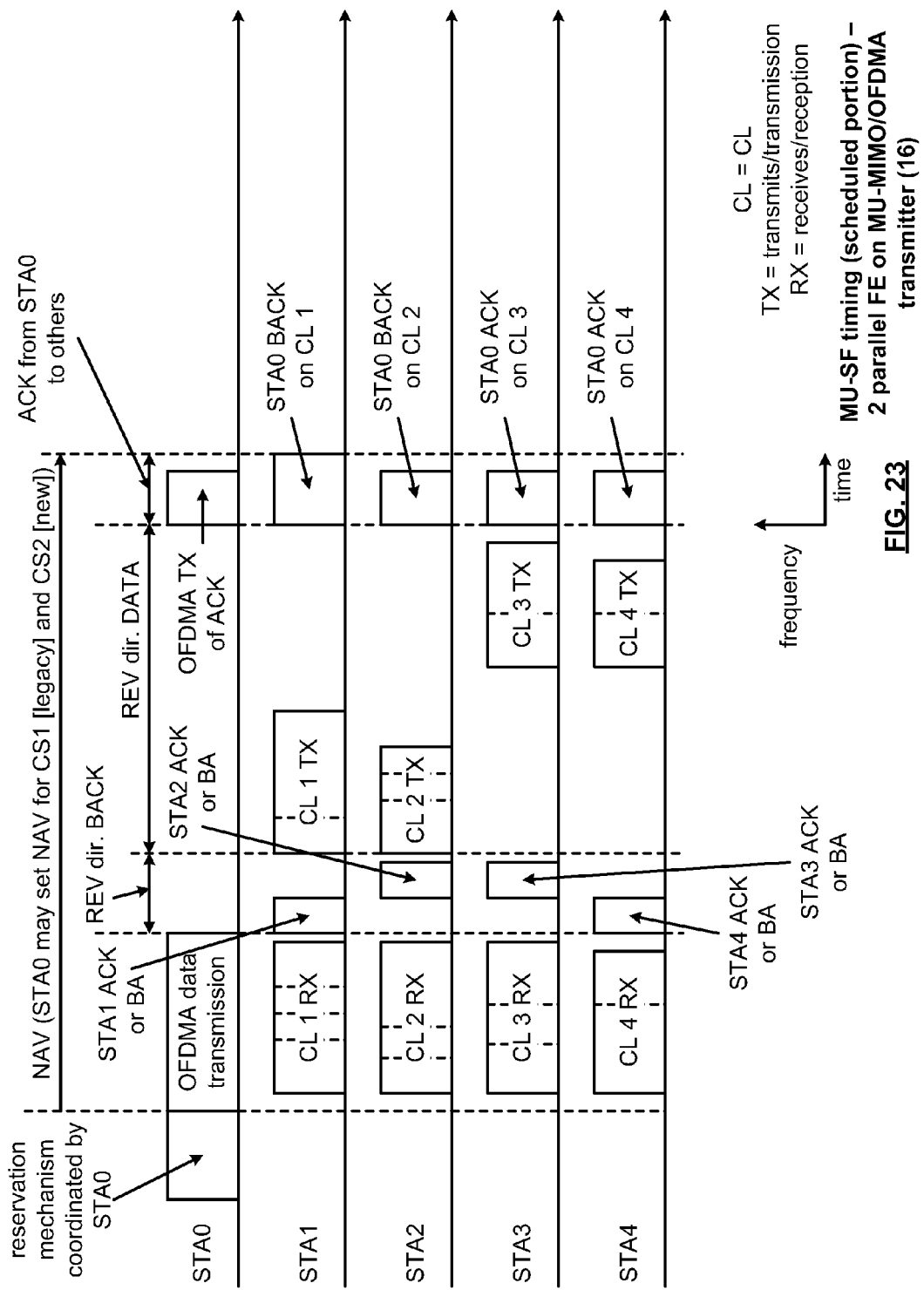

Referring to FIG. 23, this embodiment shows parallel transmissions from two or more STAs to support simultaneous communication with the transmitting wireless communication device. The transmitting wireless communication device has capability to receive from two or more STAs simultaneously. In this diagram, STA0 is again designated as being the transmitting wireless communication device (e.g., a MU-MIMO, OFDMA capable transmitter). STA1 receives and transmits on cluster 1, STA2 receives and transmits on cluster 2, STA3 receives and transmits on cluster 3, and STA4 receives and transmits on cluster 4.

Figure 24:
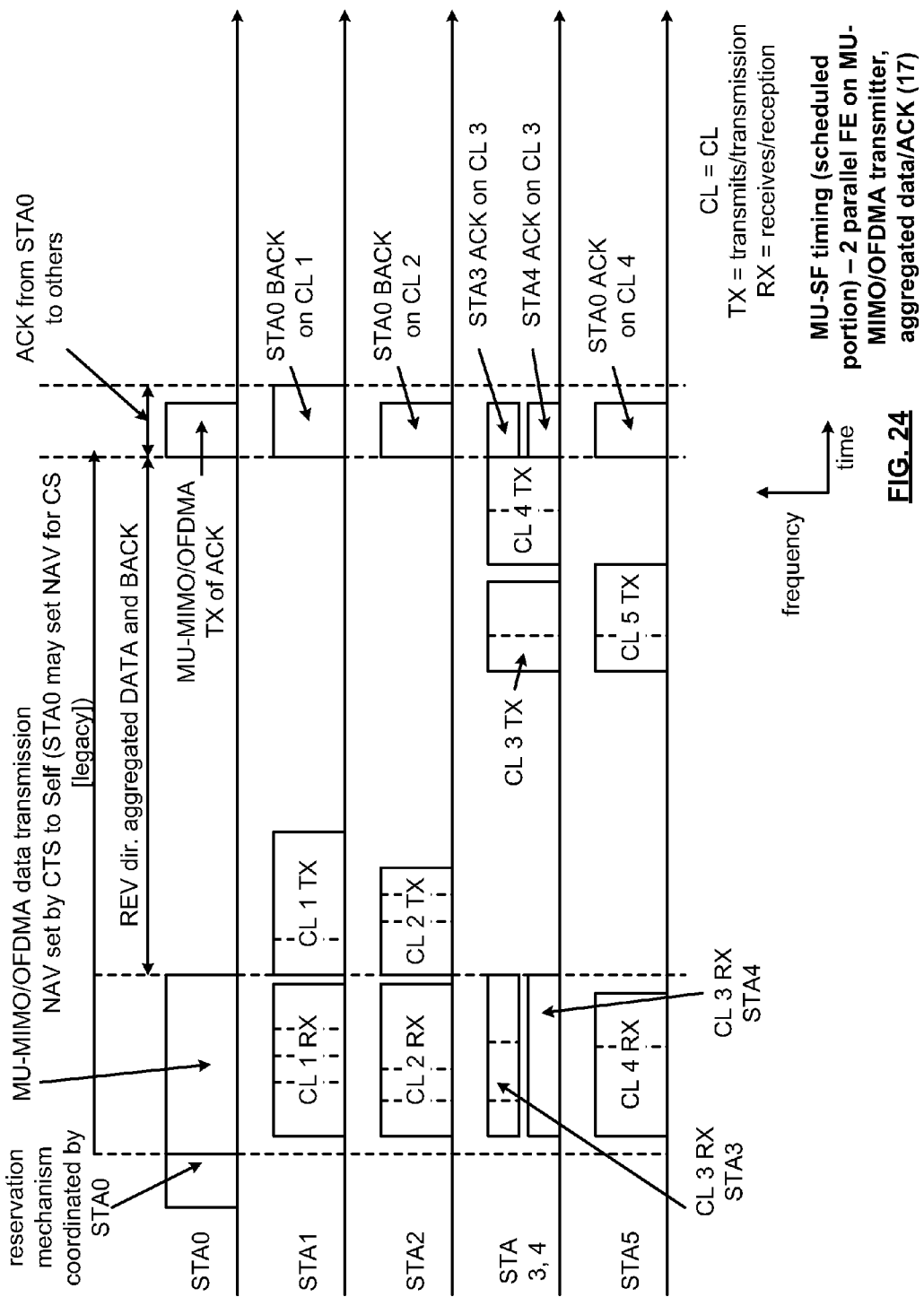

Referring to FIG. 24, this embodiment shows parallel transmissions from two or more STAs to support simultaneous communication with the transmitting wireless communication device such that reverse direction data being aggregated with ACKs.

In this diagram, STA0 is again designated as being the transmitting wireless communication device (e.g., a MU-MIMO, OFDMA capable transmitter). STA1 receives and transmits on cluster 1. STA2 receives and transmits on cluster 2. STA3 and STA4 operate using clusters 3, 4, and also have MU-MIMO separation on cluster 3. STA3 transmits on cluster 3, and STA4 transmits on cluster 4. STA3 transmits on cluster 3. STA5 receives and transmits on cluster 4.

Figure 25:
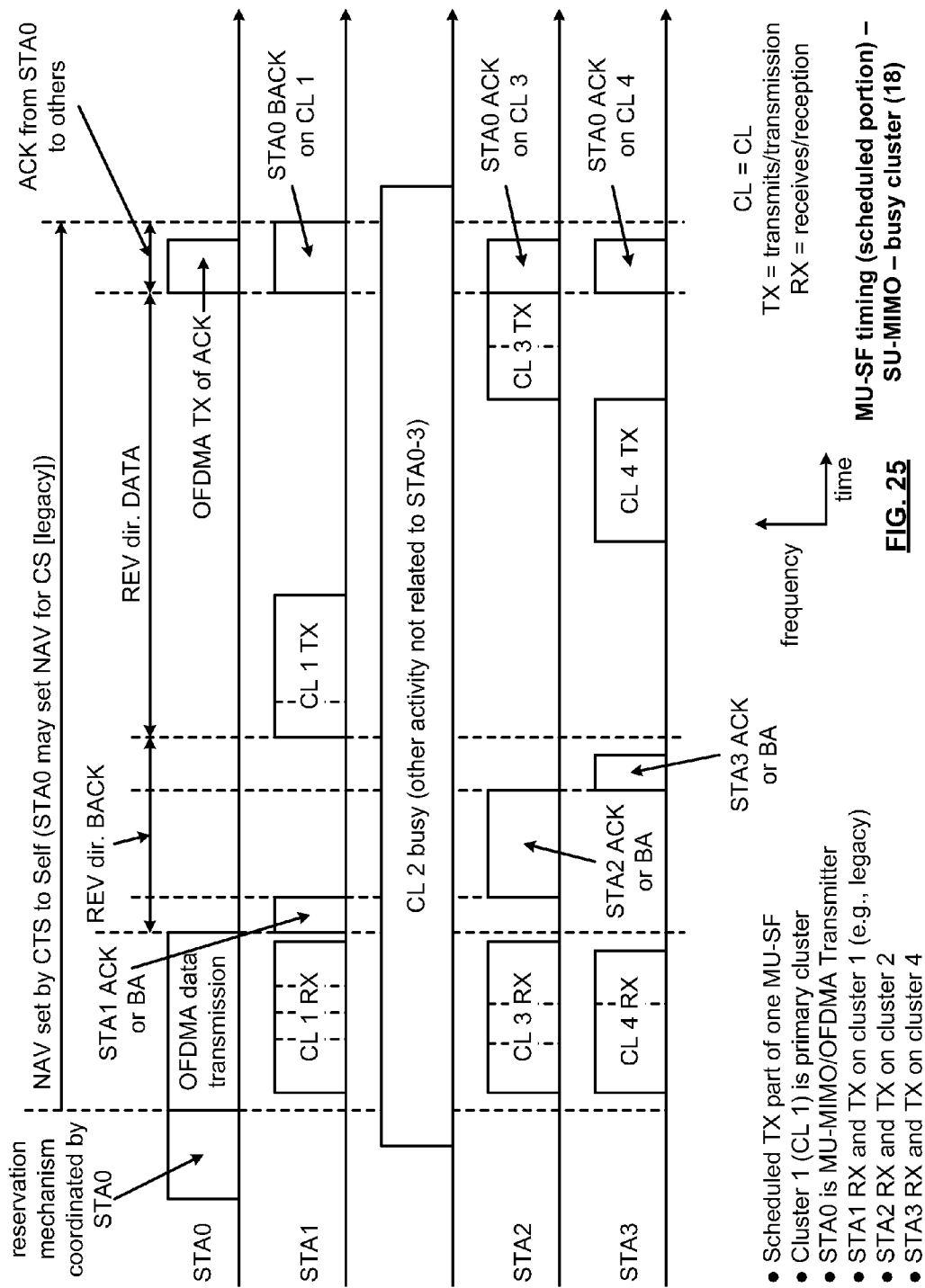

Referring to FIG. 25, this embodiment shows a situation where one or more clusters are not available, and as such the operation continues by excluding the cluster that is busy. This embodiment shows a situation where cluster 2 is busy with respect to certain activities not related to the STAs 0-3.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. STA1 may be a legacy (e.g., TGn) wireless communication device. STA2 receives and transmits on cluster 3. STA3 receives on cluster 3 and transmits on cluster 4.

Figure 26:
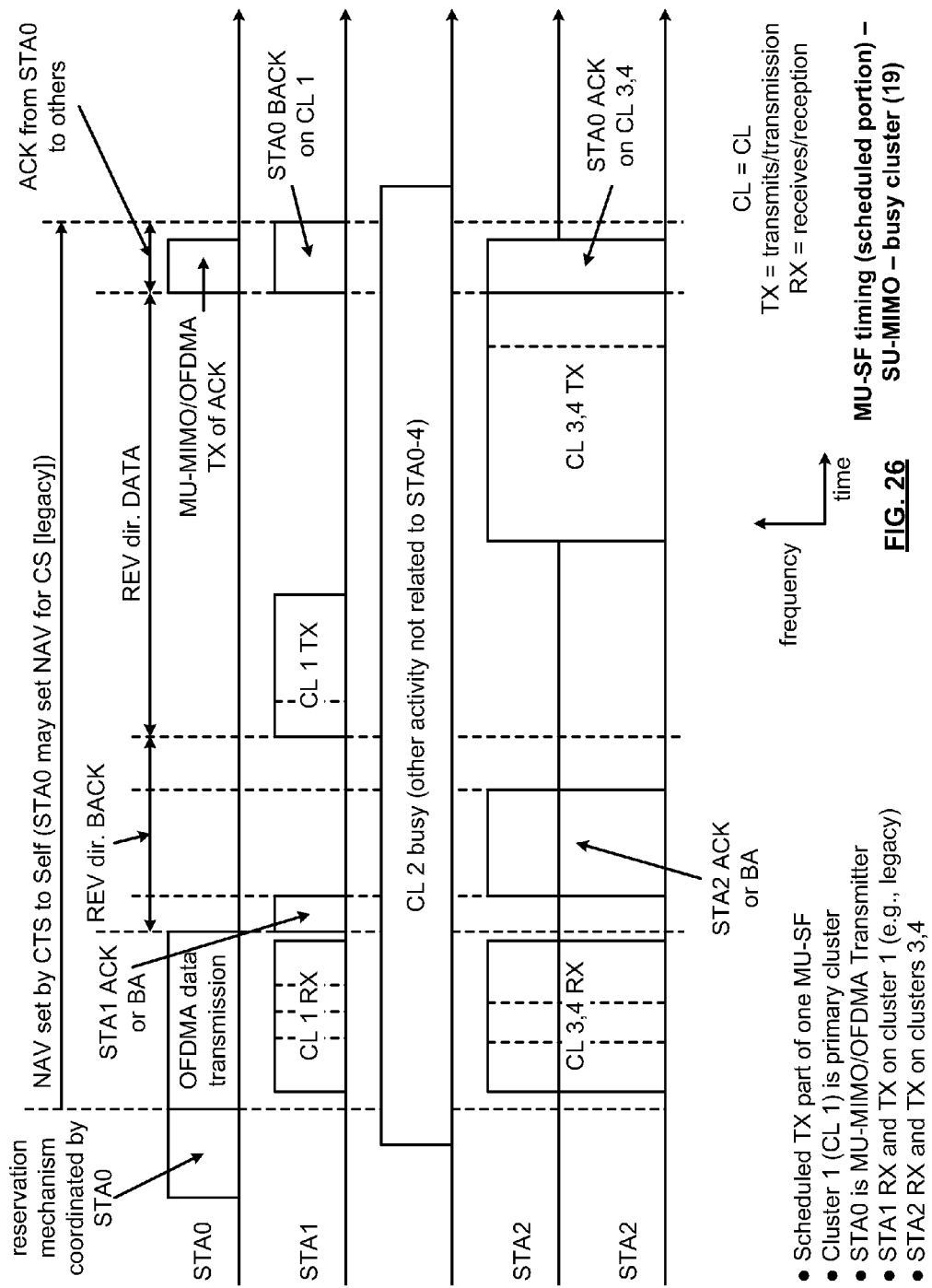

Referring to FIG. 26, this embodiment shows another situation where one or more clusters are not available, and as such the operation continues by excluding the cluster that is busy.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. STA1 may be a legacy (e.g., TGn) wireless communication device. STA2 receives and transmits on clusters 3, 4.

Figure 27:
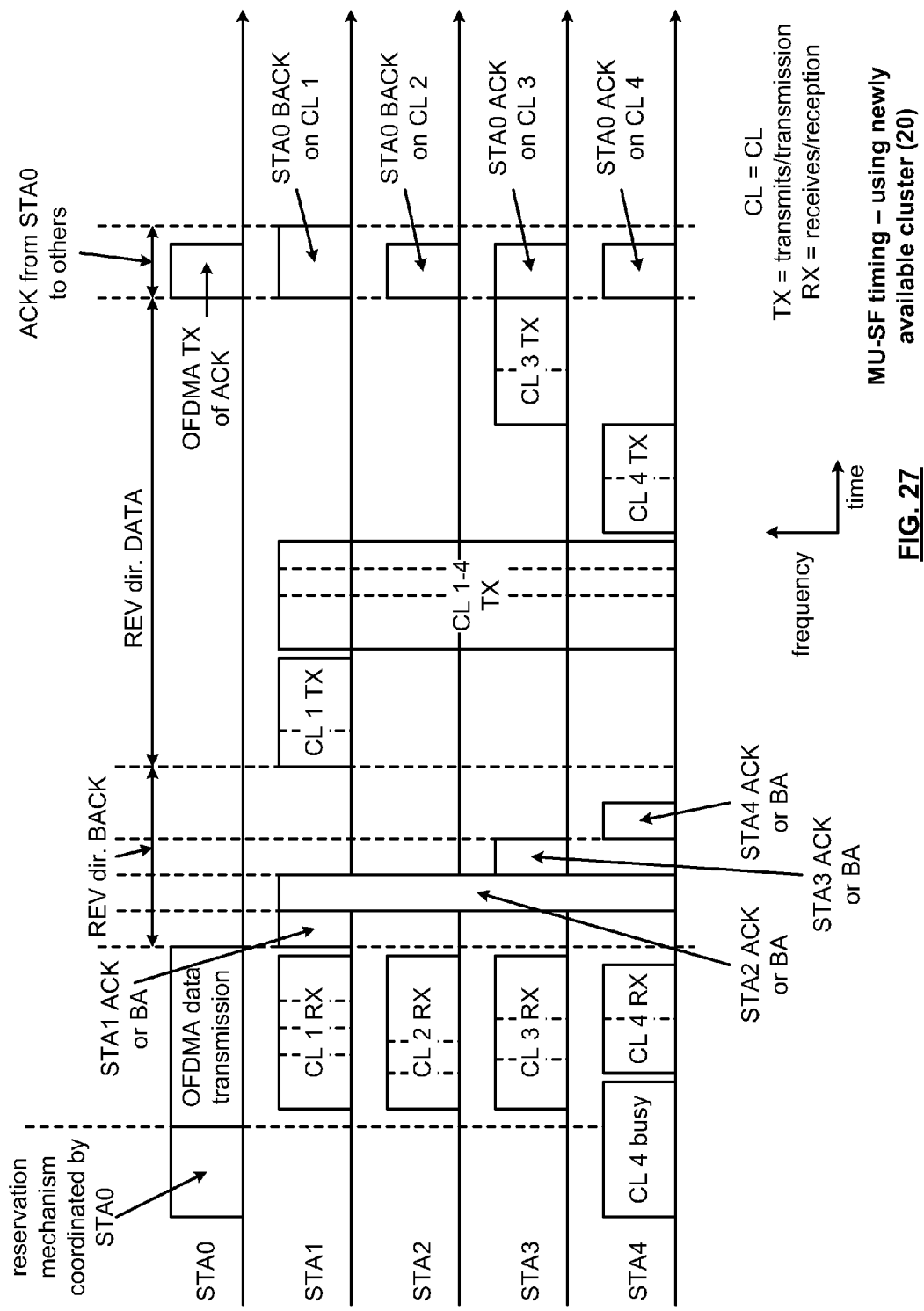

Referring to FIG. 27, this embodiment shows a situation where a cluster (e.g., cluster 4) is initially unavailable yet becomes available during reception. Once the cluster becomes available, operation continues using the newly available cluster.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. STA1 may be a legacy (e.g., TGn) wireless communication device. STA2 receives on cluster 2, and STA2 receives on clusters 1-4. STA3 receives and transmits on cluster 3, and STA4 receives and transmits on cluster 4.

Figure 28:
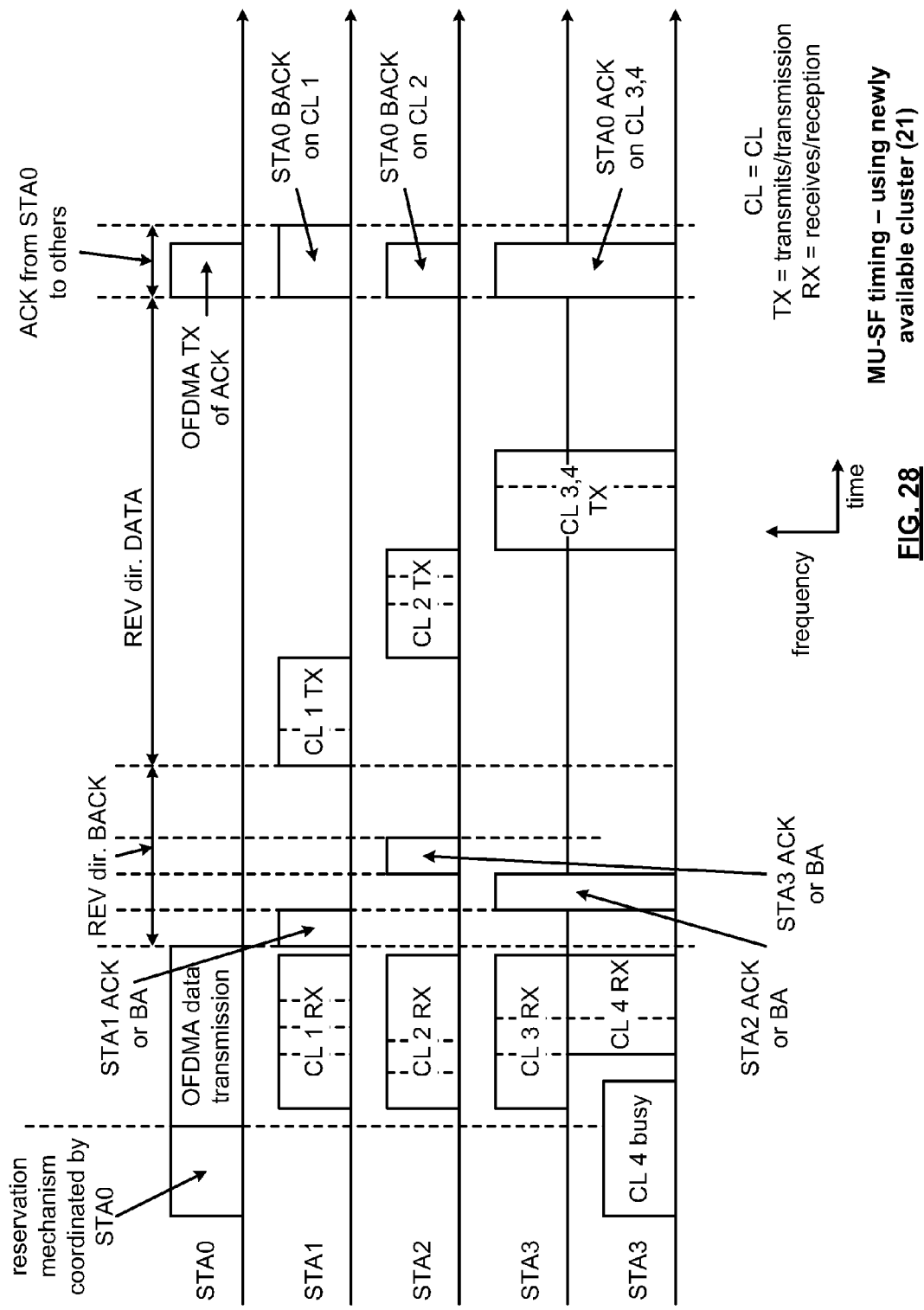

Referring to FIG. 28, this embodiment shows another situation where a cluster (e.g., cluster 4) is initially unavailable yet becomes available during reception. Once the cluster becomes available, operation continues using the newly available cluster.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. STA1 may be a legacy (e.g., TGn) wireless communication device. STA2 receives on cluster 2, and STA2 receives on clusters 1-4. STA3 receives and transmits on both clusters 3, 4.

Figure 29:
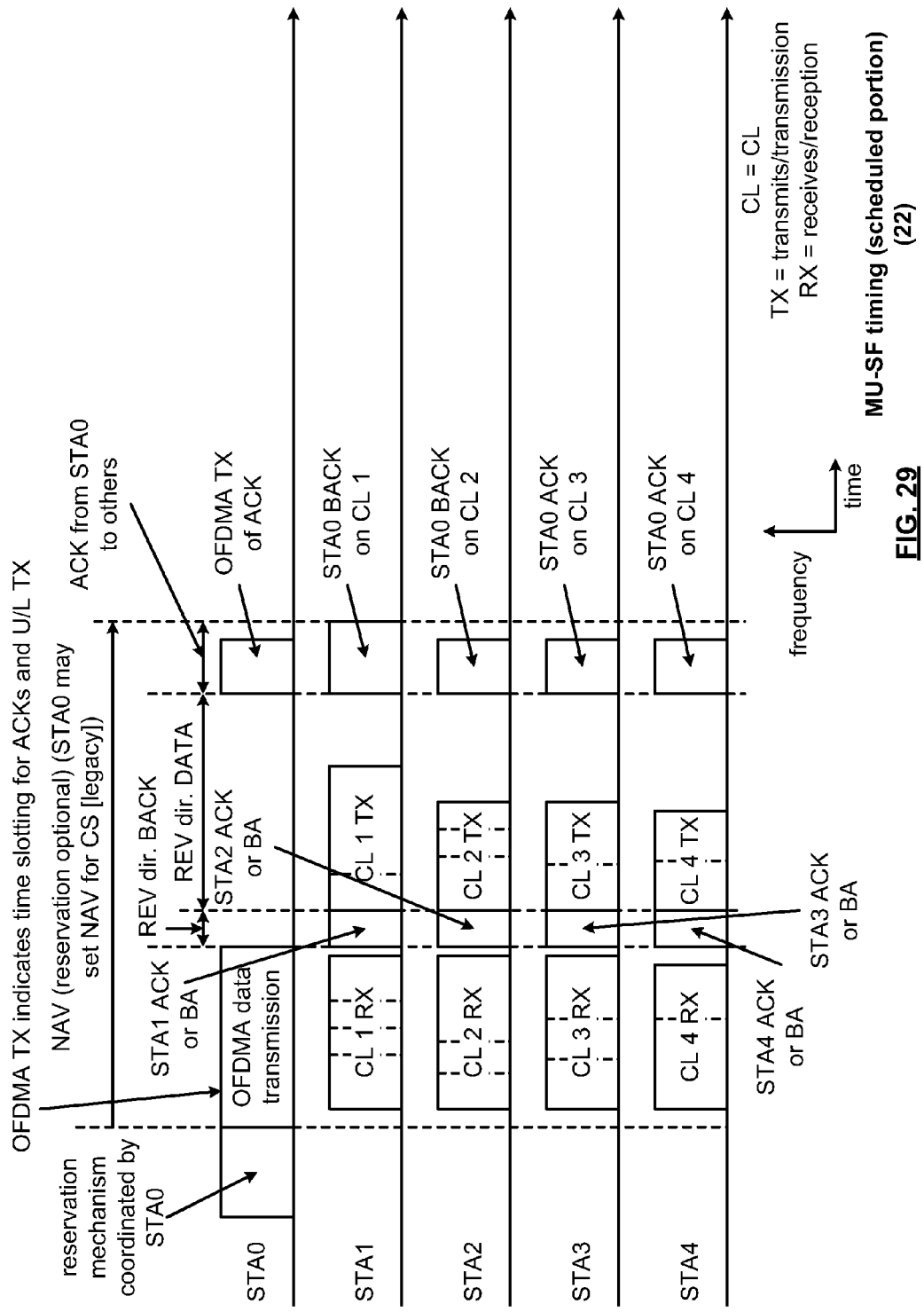

Referring to FIG. 29, this embodiment shows a multi-user transmission in forward and reverse directions such that all the STAs respond back to the transmitting wireless communication device simultaneously.

In this diagram, STA0 is designated as being the transmitting wireless communication device (e.g., a MU-MIMO, OFDMA capable transmitter). Cluster 1 is designated as being the primary cluster. STA1 receives and transmits on cluster 1. STA1 may be a legacy (e.g., TGn) wireless communication device. STA2 receives and transmits on cluster 2, STA3 receives and transmits on cluster 3, and STA3 receives and transmits on cluster 4.

Figure 30:
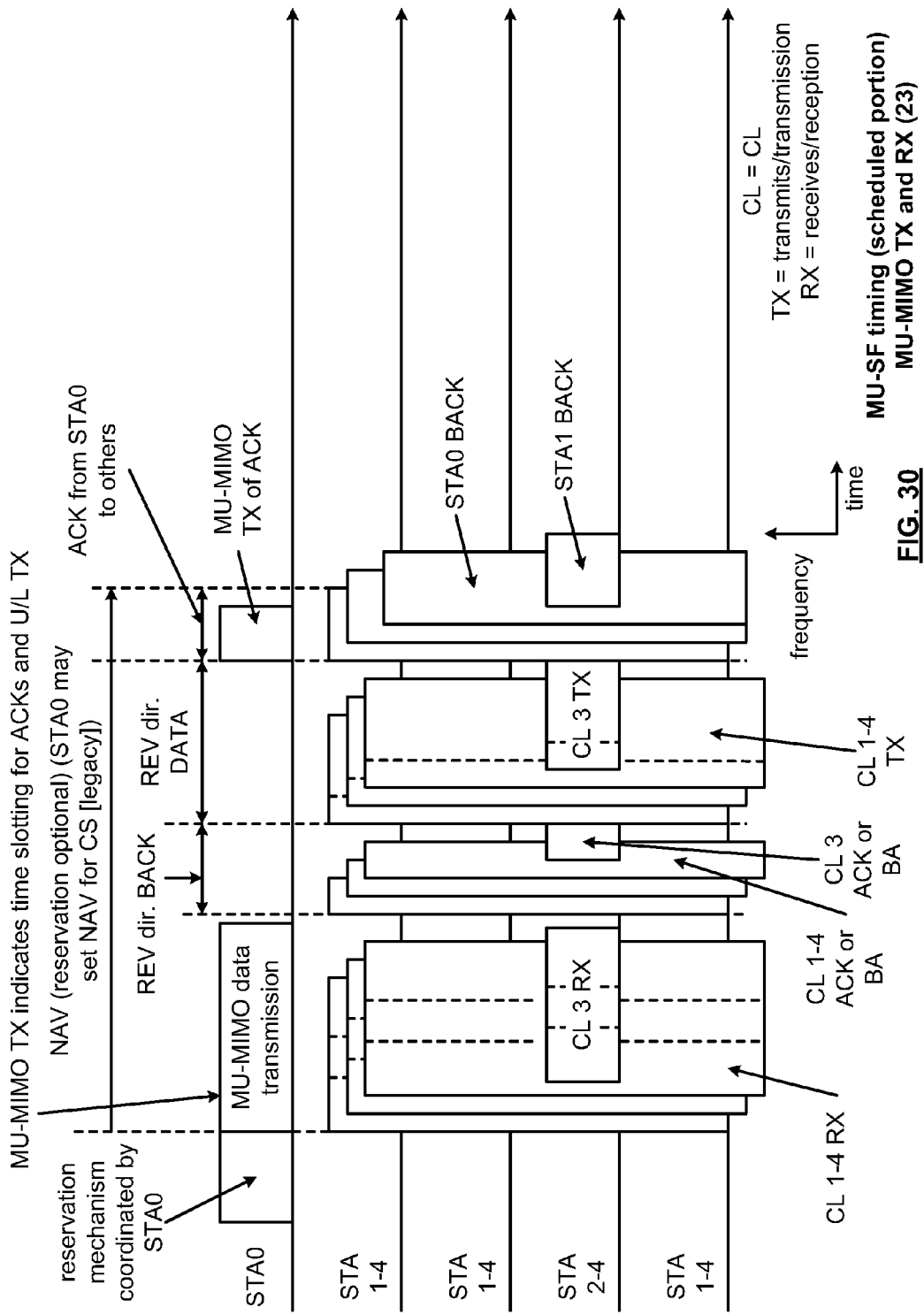

Referring to FIG. 30, this embodiment shows a situation where forward transmissions are performed in accordance with MU-MIMO and multiple clusters simultaneously. For example, STAs 1-4 operates using clusters 1-4 in accordance with MU-MIMO reception and transmission.

Figure 31:
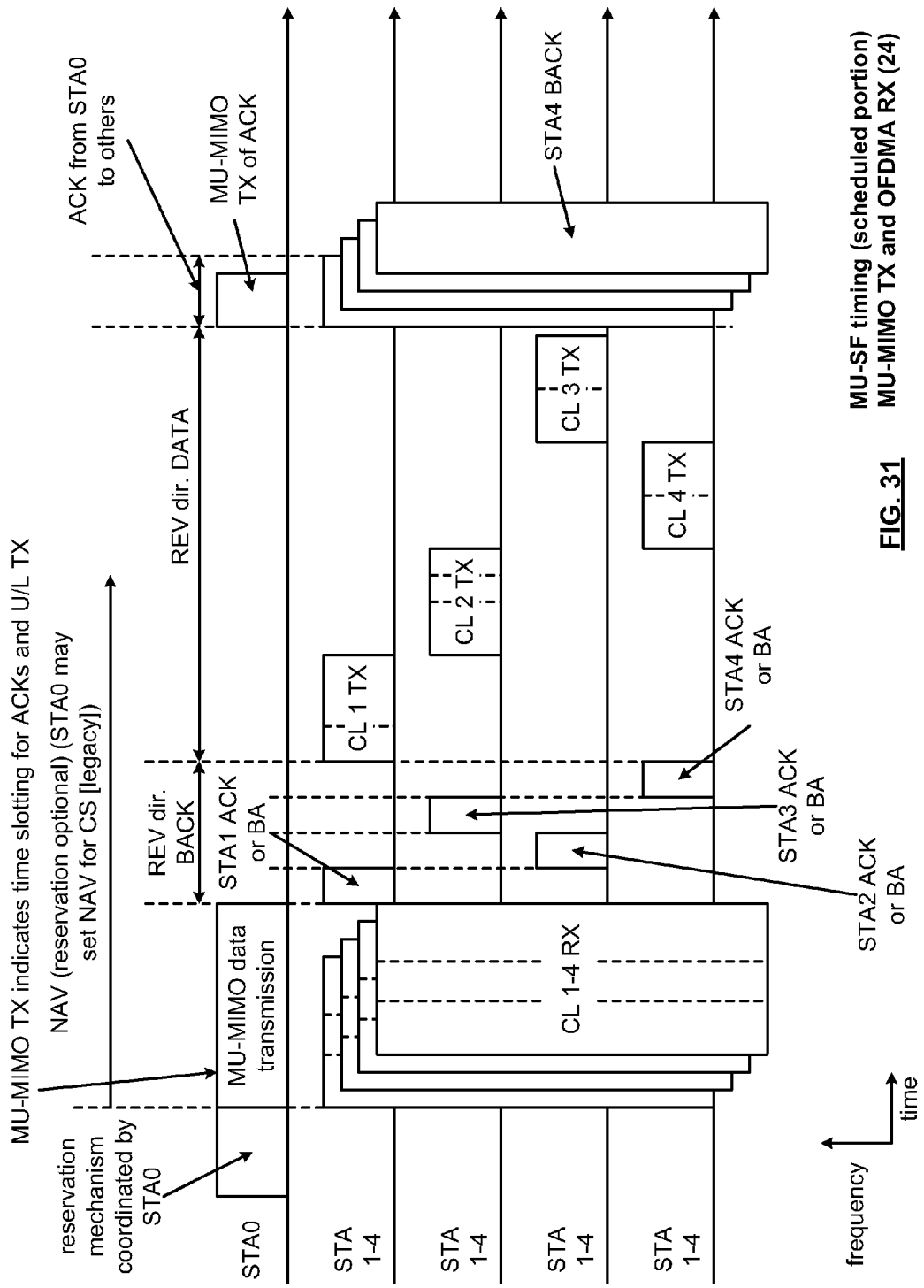

Referring to FIG. 31, this embodiment shows a situation where forward transmissions are performed in accordance with MU-MIMO, and reverse transmissions are made using multiple clusters. As can be seen, in comparison to the previous embodiment where both forward and reverse directions are performed in accordance with MU-MIMO signaling, this diagram shows different means of communication in the opposite directions. Forward transmissions are performed in accordance with MU-MIMO, whereas reverse transmissions are performed sequentially.

Figure 32:
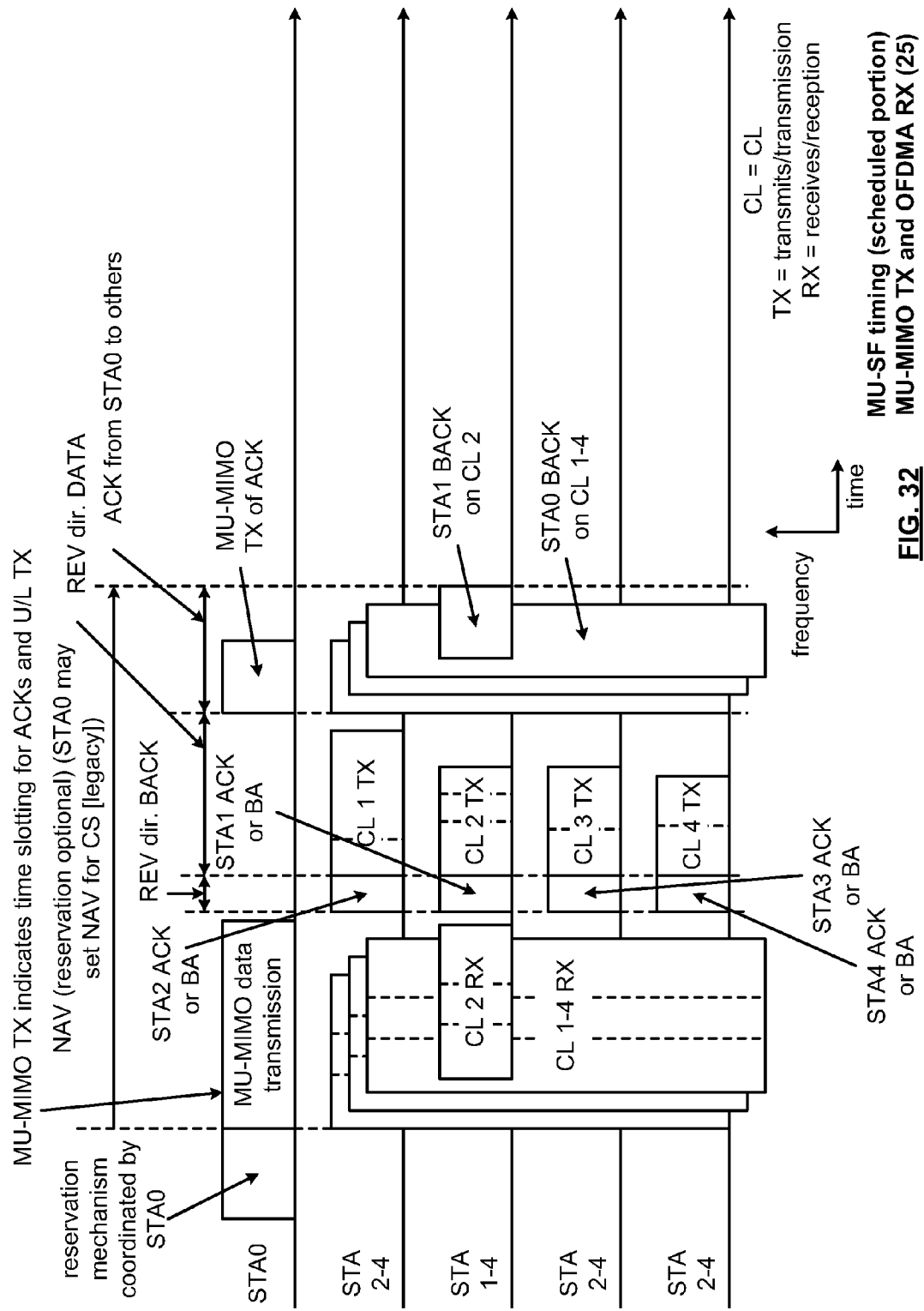

Referring to FIG. 32, this embodiment shows a situation where forward transmissions are performed in accordance with MU-MIMO, and reverse transmissions are made using multiple clusters. Forward transmissions are performed in accordance with MU-MIMO, whereas reverse transmissions are performed in accordance with OFDMA. This diagram may be viewed as being a combination of the previous three diagrams.

Figure 33:
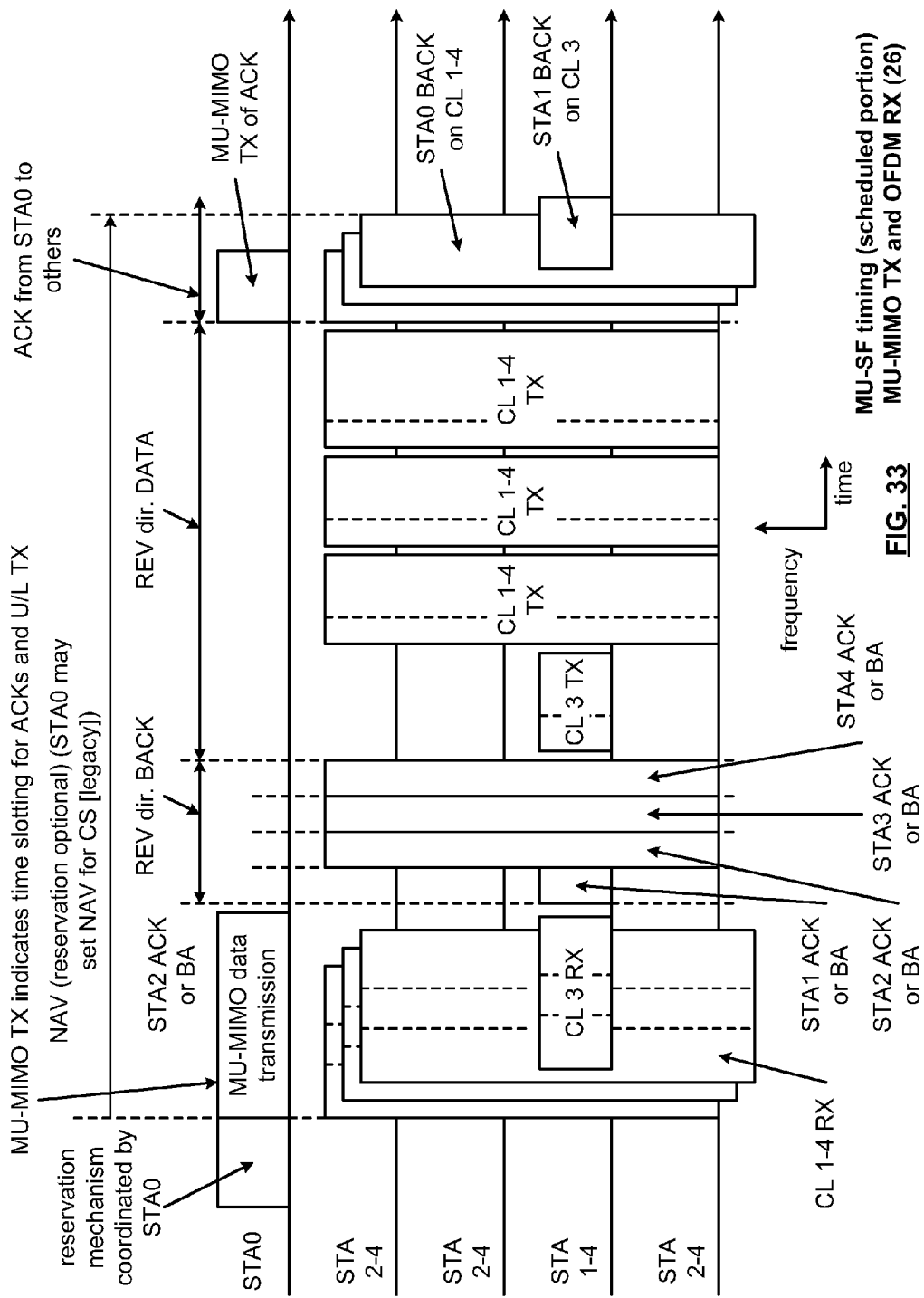

Referring to FIG. 33, this embodiment shows a situation where forward transmissions are performed in accordance with MU-MIMO and multiple clusters, whereas responses or reverse transmissions are performed sequentially. Some receiving wireless communication devices (users) use different clusters for their respective responses, and some of the receiving wireless communication devices (users) have different capabilities.

FIG. 34A and FIG. 34B are diagrams illustrating various embodiments of multiple forward and reverse scheduled transmissions as may be effectuated using respective MU-SFs. These diagrams show how the scheduled access portion of a MU-SF may be sub-divided to allow for multiple forward and reverse transmission formats. For example, the portion of a MU-SF associated with a scheduled operational mode portion may include more than one data transmission followed by ACK optionally including reverse data, and an ACK associated with that reverse data transmission.

Those transmissions from a MU-SF owner, and the associated reverse traffic, may be divided into successive time periods to help reduce the delay on the uplink/downlink (U/L and D/L) traffic. In certain communication system applications in which real-time operation has high importance, the reduction of such delay can significantly improve performance. Also, this division of the successive time periods may help allow for cluster monitoring between the respective packets. Therefore, transmission of the packets on newly available clusters, as well as any clusters currently being used, may be performed. A scheduled time slot may be included for certain STAs when operating in power save mode to wake up for possible OFDMA downlink traffic. It is noted that more than one STA may wake up at the same time, on the same cluster, to avoid overhead.

Certain power save mode parameters may be considered in the scheduler (e.g., the scheduler being a transmitting wireless communication device, an AP, etc.). That is to say, the scheduler may consider the wake-up of one or more STAs. For one example, if a given STA is going to enter the power save operational mode, then the packets may be given a higher priority to be aggregated with an upcoming transmission. Alternatively, a STA may be able to modify its particular wake-up time as a function of what the scheduler tells it.

FIG. 35 is a diagram illustrating an embodiment of multiple transmissions and receptions with cluster monitoring in accordance with a MU-SF. In accordance with such cluster monitoring, the monitoring determines if the cluster is busy or occupied. For example, within the diagram, the reference characters D1, D2, D3 correspond to respective MU-MIMO/OFDMA transmissions from a reference characters R1, R2, R3 correspond to respective ACKs and/or reverse traffic. The reference characters R1, R2, R3 correspond to respective ACKs and/or reverse traffic, the reference characters A1, A2, A3 (A3 being longer in duration) correspond to respective ACK transmissions from the transmitting wireless communication device. The reference characters C1, C2 correspond to the respective clusters that are being monitored. With respect to the operation of the transmitting wireless communication device (e.g., a MU-MIMO/OFDMA transmitter) may switch from a transmission mode of operation to a reception mode of operation at the time of cluster monitoring.

With respect to the periodicity of a MU-SF, certain of the wireless communication devices (e.g., legacy users, legacy type devices such as TGn devices) are forced not to perform transmissions when other of the wireless communication devices (e.g., newer devices such as TGac devices) are performing transmissions. The contention free portion of operation in accordance with a MU-SF (e.g., the scheduled access portion of the MU-SF), the scheduled access time of the MU-SF can be at some contention free time interval which is announced by MU-SF owner (e.g., by the transmitting wireless communication device). When operating in accordance with the contention free period, collisions can be avoided from recipients that did not receive clear to send (CTS) to self (CST2SELF) or the duration field. For example, the use of a contention free period can be employed to reduce the probability of a collision during a MU-SF announcement transmission.

When the contention free period is announced by the MU-SF owner, then all of the associated MU-SF users recipients will comply. Various mechanisms can be performed for effectuating such a contention free period, such as CST2SELF, RTS/CTS, quiet element, and/or other means. Also, various mechanisms can be performed for effectuating cluster occupancy (e.g., beacons, etc.).

FIG. 36 is a diagram illustrating an embodiment of request to send (RTS) and clear to send (CTS) exchanges among various wireless communication devices.

Referring to FIG. 36, this embodiment shows the respective RTSs, being transmitted on respective clusters, and the respective CTSs being transmitted on those same respective clusters. Thereafter, an OFDMA data transmission is sent to the respective STAs, and each respective STA provides an ACK of BACK in the reverse direction to the transmitting wireless communication device followed by reverse data transmissions. In response to the reverse data transmissions, the transmitting wireless communication device sends an OFDMA transmission of ACK on the respective clusters to the respective STAs.

FIG. 37 is a diagram illustrating yet another embodiment of medium access among various wireless communication devices in accordance with scheduled access portions of a MU-SF.

Referring to FIG. 37, this embodiment shows operation analogous to the previous diagram with at least one difference being that respective clear to send (CTS) to self (CST2SELF) transmissions are made preliminarily on the respective clusters.

Figure 38:
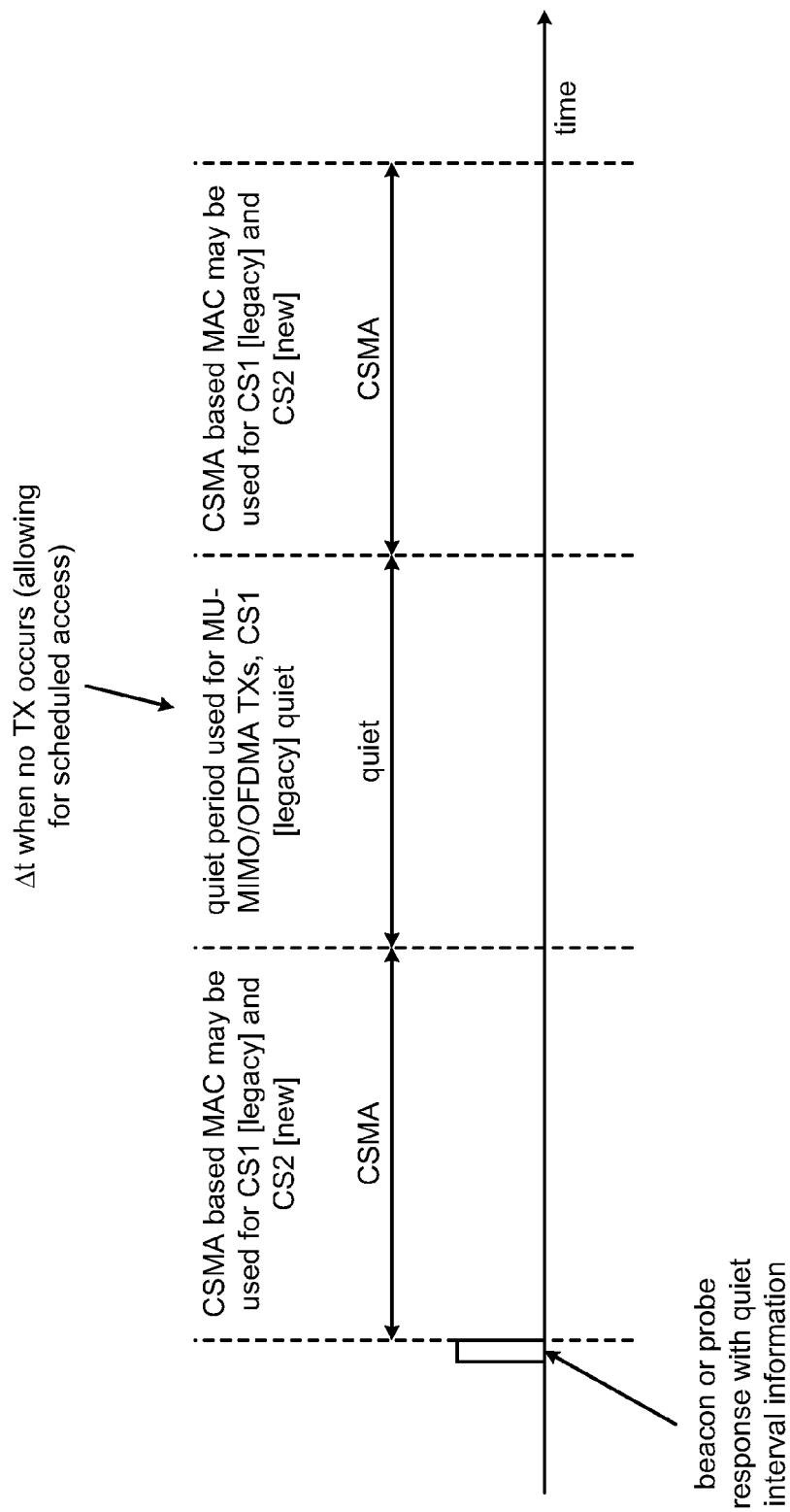
FIG. 38 is a diagram illustrating an embodiment of quiet element operation as may be effectuated using a MU-SF.

FIG. 38 is a diagram illustrating an embodiment of quiet element operation as may be effectuated using a MU-SF. A quiet element may be transmitted as part of beacons and probe responses within the communication system, and the quiet element specifies an interval when no transmission occurs in the current cluster. This indicated interval may originally be designed to perform cluster measurement without interference from other STAs (e.g., such as in accordance with the detection of the presence of radar). Quiet element may be used to take certain of the wireless communication devices (e.g., legacy users, legacy type devices such as TGn devices) off of the medium (off of the air) so that interference and interruption from such wireless communication devices (legacy) may be minimized during the scheduled access operational mode portion of a MU-SF.

FIG. 39A, FIG. 39B, FIG. 40, FIG. 41A, and FIG. 41B are diagrams illustrating various embodiments of methods for operating one or more wireless communication devices.

Referring to method 3900 of FIG. 39A, the method 3900 begins by operating at least one antenna for transmitting a multi-user super-frame (MU-SF) announcement frame to a plurality of wireless communication devices, the MU-SF announcement indicating a plurality of super-frames therein, as shown in a block 3910. The transmitting wireless communication device may be an access point (AP), a wireless station (STA), or other wireless communication device. In some embodiments, MU-SF announcement frame being part of beacon, probe response, etc., as shown in a block 3910a. The MU-SF announcement frame may take any of a variety of forms, including being a multi-user multiple input multiple output (MU-MIMO) frame, an orthogonal frequency division multiple access (OFDMA) frame, a combination thereof, or some other type of frame.

Based on the MU-SF announcement, the method 3900 continues by operating a first of the plurality of wireless communication devices in accordance with a first operational mode during a first portion of a MU-SF, as shown in a block 3920. In certain embodiments, the first operational mode is a carrier sense multiple access/collision avoidance (CSMA/CA) operational mode, as shown in a block 3920a.

Also, based on the MU-SF announcement, the method 3900 then operates a second of the plurality of wireless communication devices in accordance with a second operational mode during a second portion of the MU-SF, as shown in a block 3930. In some embodiments, second operational mode being scheduled access operational mode, as shown in a block 3930a.

Referring to method 3901 of FIG. 39B, the method 3901 begins by operating at least one antenna for transmitting a MU-SF announcement frame to a plurality of wireless communication devices, the MU-SF announcement indicating at least one super-frame therein (having respective CSMA/CA and scheduled access portions), as shown in a block 3911. As within other embodiments, the transmitting wireless communication device may be an access point (AP), a wireless station (STA), or other wireless communication device.

Based on the MU-SF announcement, the method 3901 then operates by operating at least one of the plurality of wireless communication devices in accordance with scheduled access during a portion of the MU-SF, as shown in a block 3921. Before the portion of the MU-SF ending, the method 3901 continues by operating at least one antenna for transmitting a contention free end (CF end) signal to direct the at least one of the plurality of wireless communication devices to release the medium for CSMA/CA operation, as shown in a block 3931. For example, the transmitting wireless communication device (or another wireless communication device within the communication system) may determine that no more scheduled access is needed or required for a particular scheduled access portion of a MU-SF. As such, a contention free operating portion may be cut short and the operation switched such that accessing the medium, as performed by various wireless communication devices, is operated in accordance with an alternative operational mode such as in accordance with CSMA/CA operation.

Figure 40:
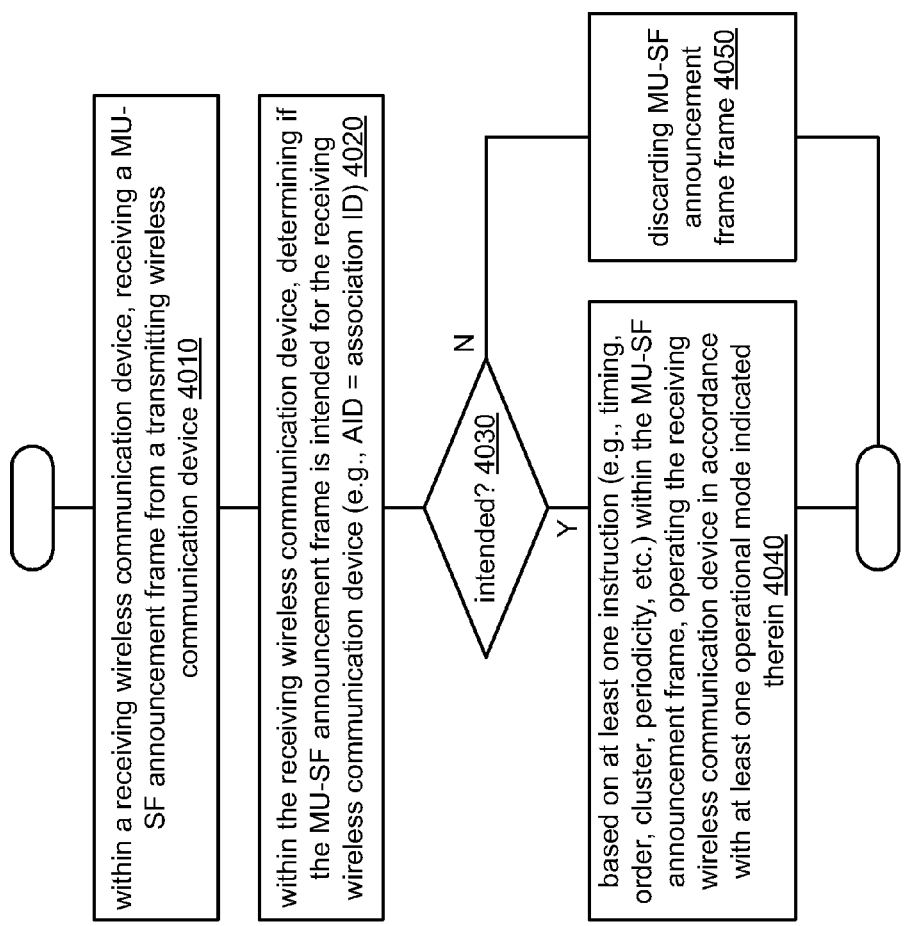

Referring to method 4000 of FIG. 40, within a receiving wireless communication device, the method 4000 begins by receiving a MU-SF announcement frame from a transmitting wireless communication device, as shown in a block 4010. Such a MU-SF announcement frame may be sent from an access point (AP), from a wireless station (STA), or other wireless communication device.

Within the receiving wireless communication device, the method 4000 continues by determining if MU-SF announcement frame is intended for the receiving wireless communication device (e.g., AID), as shown in a block 4020. For example, the MU-SF announcement frame may include one or more association ID or MAC addresses therein to indicate for which receiving wireless communication devices the MU-SF announcement frame is intended.

If the MU-SF announcement frame is intended for the receiving wireless communication device, as determined by the decision block 4030, then based on at least one instruction (e.g., timing, order, cluster, periodicity, etc.) as indicated within the MU-SF announcement frame, the method 4000 continues by operating the receiving wireless communication device in accordance with at least one operational mode indicated therein, as shown in a block 4040. For example, the receiving wireless communication device may operate in accordance with CSMA/CA or scheduled access as directed by the MU-SF announcement frame. Alternatively, if the MU-SF announcement frame is not intended for the receiving wireless communication device, the method 4000 continues by discarding the MU-SF announcement frame, as shown in a block 4050.

Referring to method 4100 of FIG. 41A, the method 4100 begins by receiving a first MU-SF announcement frame from a transmitting wireless communication device (e.g., AP), as shown in a block 4110. The transmitting wireless communication device may be an access point (AP), a wireless station (STA), or other wireless communication device. The receiving wireless communication device may be a STA and/or any other type of wireless communication device.

Based on the first MU-SF announcement, the method 4100 continues by operating a plurality of wireless communication devices respectively in accordance with CSMA/CA and scheduled access during respective portions of a first plurality of MU-SFs indicated within the first MU-SF announcement, as shown in a block 4120.

The method 4100 then operates by receiving a second MU-SF announcement frame from the transmitting wireless communication device (e.g., AP), as shown in a block 4130. Based on the second MU-SF announcement, the method 4100 continues by operating the plurality of wireless communication devices (or a subset thereof) respectively in accordance with CSMA/CA and scheduled access during respective portions of a second plurality of MU-SFs indicated within the first MU-SF announcement, as shown in a block 4140.

In accordance with the method 4100, different MU-SFs may be provided to govern operation of various wireless communication devices within a wireless communication system. A new or updated MU-SF may be provided after a previous MU-SF has been provided to govern operation of the wireless communication devices within the wireless communication system.

Referring to method 4101 of FIG. 41B, the method 4101 begins by operating at least one antenna for transmitting a first MU-SF announcement frame to a plurality of wireless communication devices, the first MU-SF announcement indicating at least a first super-frame therein (having a first CSMA/CA portion and a first scheduled access portion), as shown in a block 4111.

Based on at least one parameter and/or other consideration, the method 4101 then operates by generating a second MU-SF announcement frame, the second MU-SF announcement indicating at least a second super-frame therein (having a second CSMA/CA portion and a second scheduled access portion), as shown in a block 4121.

In certain embodiments, the method operates by scaling respective durations of CSMA/CA and scheduled access portions, as shown in a block 4121*a*. In other words, the CSMA/CA and scheduled access portions within different MU-SFs may be different. For example, such portions within a MU-SF may be modified and adjusted based on any number of considerations, including such portions within a previous one or more MU-SFs.

The method 4101 continues by operating at least one antenna for transmitting the second MU-SF announcement frame to the plurality of wireless communication devices (or a subset thereof), as shown in a block 4131. The second MU-SF announcement frame may include such modified and adjusted portions therein.

It is noted that, while various and multiple embodiments of methods for performing operations in accordance with various aspects of the invention have been presented for effectuating scheduled access and contention based means for performing medium access by various wireless communication devices within communication system, these specific examples and embodiments are not exhaustive, and the principles described herein may be adapted to accommodate any desired configuration and manner of performing operation in accordance with various operational modes (e.g., scheduled access and contention based means for performing medium access) in accordance with a number of selectable principles (e.g., order, sequence, timing, cluster, periodicity, signaling format, antenna configuration, etc.).

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for operating a wireless communication device, the method comprising:
generating a multi-user super-frame (MU-SF) announcement frame, wherein:
the MU-SF announcement frame indicating a plurality of MU-SFs during which a plurality of wireless communication devices perform medium access; and
each of the plurality of MU-SFs including a respective first period during which a first of the plurality of wireless communication devices accesses the medium in accordance with a first operational mode, corresponding to a carrier sense multiple access/collision avoidance (CSMA/CA) operational mode applied to at least one of a first plurality of clusters, and a respective second period during which a second of the plurality of wireless communication devices accesses the medium in accordance with a second operational mode using at least one of a second plurality of clusters, such that each of the first plurality of clusters and the second plurality of clusters being a respective mapping of orthogonal frequency division multiplexing (OFDM) tones within a corresponding at least one channel among a corresponding at least one frequency band;
operating a plurality of antennae for transmitting the MU-SF announcement frame to the plurality of wireless communication devices; and
based on the MU-SF announcement frame, supporting communication with the plurality of wireless communication devices or a subset of the plurality of wireless communication devices in accordance with each respective first period and each respective second period of the plurality of MU-SFs.

2. The method of claim 1, wherein:
the MU-SF announcement frame being a multi-user multiple input multiple output (MU-MIMO) frame or an orthogonal frequency division multiple access (OFDMA) frame.

3. The method of claim 1, wherein:

the second operational mode corresponding to a scheduled access operational mode.

4. The method of claim 3, further comprising:

when operating within the scheduled access operational mode, operating the plurality of antennae for transmitting a contention free end (CF end) signal to the plurality of wireless communication devices thereby directing at least one of the plurality of wireless communication devices to cease performing medium access in accordance with the scheduled access operational mode and to perform medium access in accordance with the CSMA/CA operational mode.

5. The method of claim 1, wherein:

the MU-SF announcement frame including cluster information indicating the second plurality of clusters for use, respectively, by the plurality of wireless communication devices for accessing the medium in accordance with the second operational mode.

6. The method of claim 1, wherein:

the first of the plurality of clusters being composed of a first plurality of channels among a first band and a second band; and the second of the plurality of clusters being composed of a second plurality of channels among a third band and a fourth band.

7. The method of claim 1, wherein:

the second plurality of clusters is the first plurality of clusters.

8. The method of claim 1, wherein:

at least one of the first plurality of clusters and the second plurality of clusters being employed during each of the first operational mode and the second operational mode.

9. The method of claim 1, further comprising:

generating at least one additional MU-SF announcement frame, wherein:
  the at least one additional MU-SF announcement frame indicating at least one additional plurality of MU-SFs during which the plurality of wireless communication devices or a subset of the plurality of wireless communication devices perform medium access; and
  each of the at least one additional plurality of MU-SFs including a respective first period during which a third of the plurality of wireless communication devices accesses the medium in accordance with the first operational mode and a respective second period during which a fourth of the plurality of wireless communication devices accesses the medium in accordance with the second operational mode;
operating the plurality of antennae for transmitting the at least one additional MU-SF announcement frame to the plurality of wireless communication devices or the subset of the plurality of wireless communication devices perform medium access; and wherein, at least one of:
  one of the plurality of MU-SFs having a length that is different than one of the at least one additional plurality of MU-SFs;
  one of the respective first periods within the plurality of MU-SFs having a length that is different than one of respective first periods within the at least one additional plurality of MU-SFs; and
  one of the respective second periods within the plurality of MU-SFs having a length that is different than one of respective second periods within the at least one additional plurality of MU-SFs.

10. The method of claim 1, further comprising:

based on the MU-SF announcement frame, directing transmission from the wireless communication device to the plurality of wireless communication devices in accordance with multi-user multiple input multiple output (MU-MIMO); and based on the MU-SF announcement frame, directing reception from the wireless communication device by the plurality of wireless communication devices in accordance with orthogonal frequency division multiple access (OFDMA).

11. The method of claim 1, further comprising:

based on the MU-SF announcement frame, directing transmission from the wireless communication device to the plurality of wireless communication devices in accordance with multi-user multiple input multiple output (MU-MIMO); and based on the MU-SF announcement frame, directing reception from the wireless communication device by the plurality of wireless communication devices in accordance with orthogonal frequency division multiple (OFDM).

12. The method of claim 1, further comprising:

based on the MU-SF announcement frame, directing transmission from the wireless communication device to the plurality of wireless communication devices in accordance with multi-user multiple input multiple output (MU-MIMO); and based on the MU-SF announcement frame, directing reception from the wireless communication device by the plurality of wireless communication devices in accordance with MU-MIMO.

13. The method of claim 1, further comprising:

based on the MU-SF announcement frame, indicating at least one of the first plurality of clusters and the second plurality of clusters for use by at least one of the plurality of wireless communication devices when transmitting an acknowledgment to the wireless communication device in response to a data transmission received from the wireless communication device.

14. The method of claim 1, further comprising:

based on the MU-SF announcement frame, permitting at least one of the plurality of wireless communication devices to aggregate a reverse data transmission with an acknowledgment when transmitting the acknowledgment to the wireless communication device in response to a forward data transmission received from the wireless communication device.

15. The method of claim 1, wherein:

the wireless communication device being an access point (AP); and the plurality of wireless communication devices being a plurality of wireless stations (STAs).

16. A method for operating a wireless communication device, the method comprising:

generating a multi-user super-frame (MU-SF) announcement frame, wherein:
  the MU-SF announcement frame indicating a plurality of MU-SFs during which a plurality of wireless communication devices perform medium access; and
  each of the plurality of MU-SFs including a respective first period during which a first of the plurality of wireless communication devices accesses the medium in accordance with a carrier sense multiple access/collision avoidance (CSMA/CA) operational mode and a respective second period during which a second of the plurality of wireless communication devices accesses the medium in accordance with a scheduled access operational mode using at least one of a plurality of clusters, such that each of the plurality of clusters being a respective mapping of orthogonal frequency division multiplexing (OFDM) tones within a corresponding at least one channel among a corresponding at least one frequency band;

operating a plurality of antennae for transmitting the MU-SF announcement frame to the plurality of wireless communication devices; and based on the MU-SF announcement frame, supporting communication with the plurality of wireless communication devices or a subset of the plurality of wireless communication devices in accordance with each respective first period and each respective second period of the plurality of MU-SFs; and wherein:

the MU-SF announcement frame including cluster information indicating the plurality of clusters for use, respectively, by the plurality of wireless communication devices for accessing the medium in accordance with the scheduled access operational mode.

17. The method of claim 16, wherein:
the MU-SF announcement frame being a multi-user multiple input multiple output (MU-MIMO) frame or an orthogonal frequency division multiple access (OFDMA) frame.

18. The method of claim 16, wherein:
the CSMA/CA operational mode applied to the at least one of the plurality of clusters, at least one additional of the plurality of clusters, or at least one additional plurality of clusters.

19. The method of claim 16, further comprising:
when operating within the scheduled access operational mode, operating the plurality of antennae for transmitting a contention free end (CF end) signal to the plurality of wireless communication devices thereby directing at least one of the plurality of wireless communication devices to cease performing medium access in accordance with the scheduled access operational mode and to perform medium access in accordance with the CSMA/CA operational mode.

20. The method of claim 16, wherein:
a first of the plurality of clusters being composed of a first plurality of channels among a first band and a second band; and
a second of the plurality of clusters being composed of a second plurality of channels among a third band and a fourth band.

21. The method of claim 16, further comprising:
employing a first of the first plurality of clusters during a first time period of the CSMA/CA operational mode; and
employing a second of the first plurality of clusters during a second time period of the CSMA/CA operational mode.

22. The method of claim 16, wherein:
at least one of the plurality of clusters being employed during each of the CSMA/CA operational mode and the scheduled access operational mode.

23. The method of claim 16, wherein:
the wireless communication device being an access point (AP); and
the plurality of wireless communication devices being a plurality of wireless stations (STAs).

24. An apparatus, comprising:
a baseband processing module to generate a multi-user super-frame (MU-SF) announcement frame; and
a plurality of antennae to transmit the MU-SF announcement frame to a plurality of wireless communication devices; and wherein:

the MU-SF announcement frame indicating a plurality of MU-SFs during which the plurality of wireless communication devices perform medium access;

each of the plurality of MU-SFs including a respective first period during which a first of the plurality of wireless communication devices accesses the medium in accordance with a first operational mode, corresponding to a carrier sense multiple access/collision avoidance (CSMA/CA) operational mode applied to at least one of a first plurality of clusters, and a respective second period during which a second of the plurality of wireless communication devices accesses the medium in accordance with a second operational mode using at least one of a second plurality of clusters, such that each of the first plurality of clusters and the second plurality of clusters being a respective mapping of orthogonal frequency division multiplexing (OFDM) tones within a corresponding at least one channel among a corresponding at least one frequency band; and based on the MU-SF announcement frame, the apparatus to support communication with the plurality of wireless communication devices or a subset of the plurality of wireless communication devices in accordance with each respective first period and each respective second period of the plurality of MU-SFs.

25. The apparatus of claim 24, wherein:
the MU-SF announcement frame being a multi-user multiple input multiple output (MU-MIMO) frame or an orthogonal frequency division multiple access (OFDMA) frame.

26. The apparatus of claim 24, wherein:
the second operational mode corresponding to a scheduled access operational mode.

27. The apparatus of claim 26, wherein:
when operating within the scheduled access operational mode, the plurality of antennae to transmit a contention free end (CF end) signal to the plurality of wireless communication devices thereby directing at least one of the plurality of wireless communication devices to cease performing medium access in accordance with the scheduled access operational mode and to perform medium access in accordance with the CSMA/CA operational mode.

28. The apparatus of claim 24, wherein:
the MU-SF announcement frame including cluster information indicating the second plurality of clusters for use, respectively, by the plurality of wireless communication devices for accessing the medium in accordance with the second operational mode.

29. The apparatus of claim 24, wherein:
the first of the plurality of clusters being composed of a first plurality of channels among a first band and a second band; and
the second of the plurality of clusters being composed of a second plurality of channels among a third band and a fourth band.

30. The apparatus of claim 24, wherein:
the second plurality of clusters is the first plurality of clusters.

31. The apparatus of claim 24, wherein:
at least one of the first plurality of clusters and the second plurality of clusters being employed during each of the first operational mode and the second operational mode.

32. The apparatus of claim 24, wherein:

the baseband processing module to generate at least one additional MU-SF announcement frame;

the at least one additional MU-SF announcement frame indicating at least one additional plurality of MU-SFs during which the plurality of wireless communication devices or a subset of the plurality of wireless communication devices perform medium access;

each of the at least one additional plurality of MU-SFs including a respective first period during which a third of the plurality of wireless communication devices accesses the medium in accordance with the first operational mode and a respective second period during which a fourth of the plurality of wireless communication devices accesses the medium in accordance with the second operational mode;

the plurality of antennae to transmit the at least one additional MU-SF announcement frame to the plurality of wireless communication devices or the subset of the plurality of wireless communication devices perform medium access; and at least one of:

one of the plurality of MU-SFs having a length that is different than one of the at least one additional plurality of MU-SFs;

one of the respective first periods within the plurality of MU-SFs having a length that is different than one of respective first periods within the at least one additional plurality of MU-SFs; and one of the respective second periods within the plurality of MU-SFs having a length that is different than one of respective second periods within the at least one additional plurality of MU-SFs.

33. The apparatus of claim 24, wherein:

the MU-SF announcement frame indicating at least one of the first plurality of clusters and the second plurality of clusters for use by at least one of the plurality of wireless communication devices when transmitting an acknowledgment to the apparatus in response to a data transmission received from the apparatus.

34. The apparatus of claim 24, wherein:

the MU-SF announcement frame permitting at least one of the plurality of wireless communication devices to aggregate a reverse data transmission with an acknowledgment when transmitting the acknowledgment to the apparatus in response to a forward data transmission received from the apparatus.

35. The apparatus of claim 24, wherein:

the apparatus being an access point (AP); and the plurality of wireless communication devices being a plurality of wireless stations (STAs).

\* \* \* \* \*